United States Patent
Smith et al.

(10) Patent No.: US 10,325,410 B1
(45) Date of Patent: Jun. 18, 2019

(54) AUGMENTED REALITY FOR ENHANCING SPORTING EVENTS

(71) Applicant: Vulcan Inc., Seattle, WA (US)

(72) Inventors: Eric Smith, Seattle, WA (US); Jonathan McElroy, Brooklyn, NY (US); Joseph Sheedy, Seattle, WA (US)

(73) Assignee: Vulcan Inc., Seattle, WA (US)

( * ) Notice: Subject to any disclaimer, the term of this patent is extended or adjusted under 35 U.S.C. 154(b) by 0 days.

(21) Appl. No.: 15/696,171

(22) Filed: Sep. 5, 2017

Related U.S. Application Data

(60) Provisional application No. 62/418,686, filed on Nov. 7, 2016.

(51) Int. Cl.
  *G06T 19/20* (2011.01)
  *G06F 3/00* (2006.01)
  (Continued)

(52) U.S. Cl.
  CPC ........ *G06T 19/006* (2013.01); *A63B 71/0669* (2013.01); *G06F 3/011* (2013.01);
  (Continued)

(58) Field of Classification Search
  CPC .. G06T 7/80; G06T 7/75; G06T 15/20; G06T 15/40; G06T 19/006; A63B 71/0669;
  (Continued)

(56) References Cited

U.S. PATENT DOCUMENTS

| | | | |
|---|---|---|---|
| 2005/0018045 A1* | 1/2005 | Thomas | G06K 9/209 348/157 |
| 2012/0293548 A1* | 11/2012 | Perez | G06F 3/012 345/633 |

(Continued)

OTHER PUBLICATIONS

"5 Elements of a Great Chroma Key," retrieved on the Internet on Nov. 7, 2016, at http://filmmakeriq.com/lessons/5-elements-of-a-great-chromakey/, 3 pages.
(Continued)

*Primary Examiner* — Jin Cheng Wang
(74) *Attorney, Agent, or Firm* — Ellen M. Bierman; Lowe Graham Jones PLLC

(57) ABSTRACT

Methods, systems, and techniques for enhancing a live sporting event using augmented reality are provided. Example embodiments provide an Augmented Reality Live Game Enhancement System ("ARLGES"), which enables users to see augmentations appear as if they are "live" on the sports field as they are watching the game. The user is able to see and interactive with these augmentations using his or her mobile device without taking his or her eyes off of the field. In some deployments, the mobile device is a cellular smartphone with an (optional) modified virtual headset. The user can view the augmentations using the camera of the phone. The ARLGES provides specific techniques for locating the user's position and for rendering augmentations that are specific to each user. This requires specialized rendering techniques because the user's mobile device positions and chroma values are determined dynamically as they do not originate from fixed or known cameras.

19 Claims, 29 Drawing Sheets
(27 of 29 Drawing Sheet(s) Filed in Color)

(51) Int. Cl.
  *H04N 9/75* (2006.01)
  *H04N 5/272* (2006.01)
  *G06T 19/00* (2011.01)
  *G06T 15/20* (2011.01)
  *G06T 7/73* (2017.01)
  *G06T 7/80* (2017.01)
  *A63B 71/06* (2006.01)
  *G06T 15/40* (2011.01)
  *G06F 3/01* (2006.01)
  *H04N 21/414* (2011.01)

(52) U.S. Cl.
  CPC .............. *G06T 7/75* (2017.01); *G06T 7/80* (2017.01); *G06T 15/20* (2013.01); *G06T 15/40* (2013.01); *H04N 5/272* (2013.01); *H04N 9/75* (2013.01); *H04N 21/41407* (2013.01); *G06T 2207/20164* (2013.01); *G06T 2207/30228* (2013.01); *G06T 2215/16* (2013.01); *G06T 2219/2012* (2013.01)

(58) Field of Classification Search
  CPC . H04L 67/325; G06F 17/30247; G06F 3/048; G06F 3/012; G06F 3/011; H04N 9/75; H04N 5/272
  USPC .......................................................... 345/633
  See application file for complete search history.

(56) References Cited

U.S. PATENT DOCUMENTS

| | | | | |
|---|---|---|---|---|
| 2015/0054823 | A1* | 2/2015 | Dzhurinskiy | H04N 5/2226 345/419 |
| 2016/0098860 | A1* | 4/2016 | Basra | H04L 67/325 345/633 |
| 2017/0124769 | A1* | 5/2017 | Saito | G06F 3/048 |
| 2017/0262704 | A1* | 9/2017 | Wnuk | G06F 17/30247 |
| 2018/0048876 | A1* | 2/2018 | Gay | G06T 19/006 |

OTHER PUBLICATIONS

"Chroma Key," retrieved on the Internet on Nov. 7, 2016, at http://www.mediacollege.com/glossary/c/chroma-key.html, 2 pages.

"NFL Fans Profiling the demographics, attitudes and digital behaviors of NFL fans," globalwebindex, GWI Audience Report, Q1 2015, 20 pages.

"Will Big Data Get Fans Off the Couch and Into the Stadium?," retrieved on the Internet on Nov. 3, 2016, at http://sps.northwestern.edu/main/news-stories/How-Big-Data-Analytics-is-Used-in-Sports-Stadiums.php, 6 pages.

"Can Big Data Save Live Sports?," retrieved on the Internet on Nov. 3, 2016, at https://insidebigdata.com/2015/09/27/can-big-data-save-live-sports/.

"Chroma key" from Wikipedia, retrieved on the Internet on Nov. 7, 2016, at https://en.wikipedia.org/wiki/Chroma_key, 9 pages.

* cited by examiner

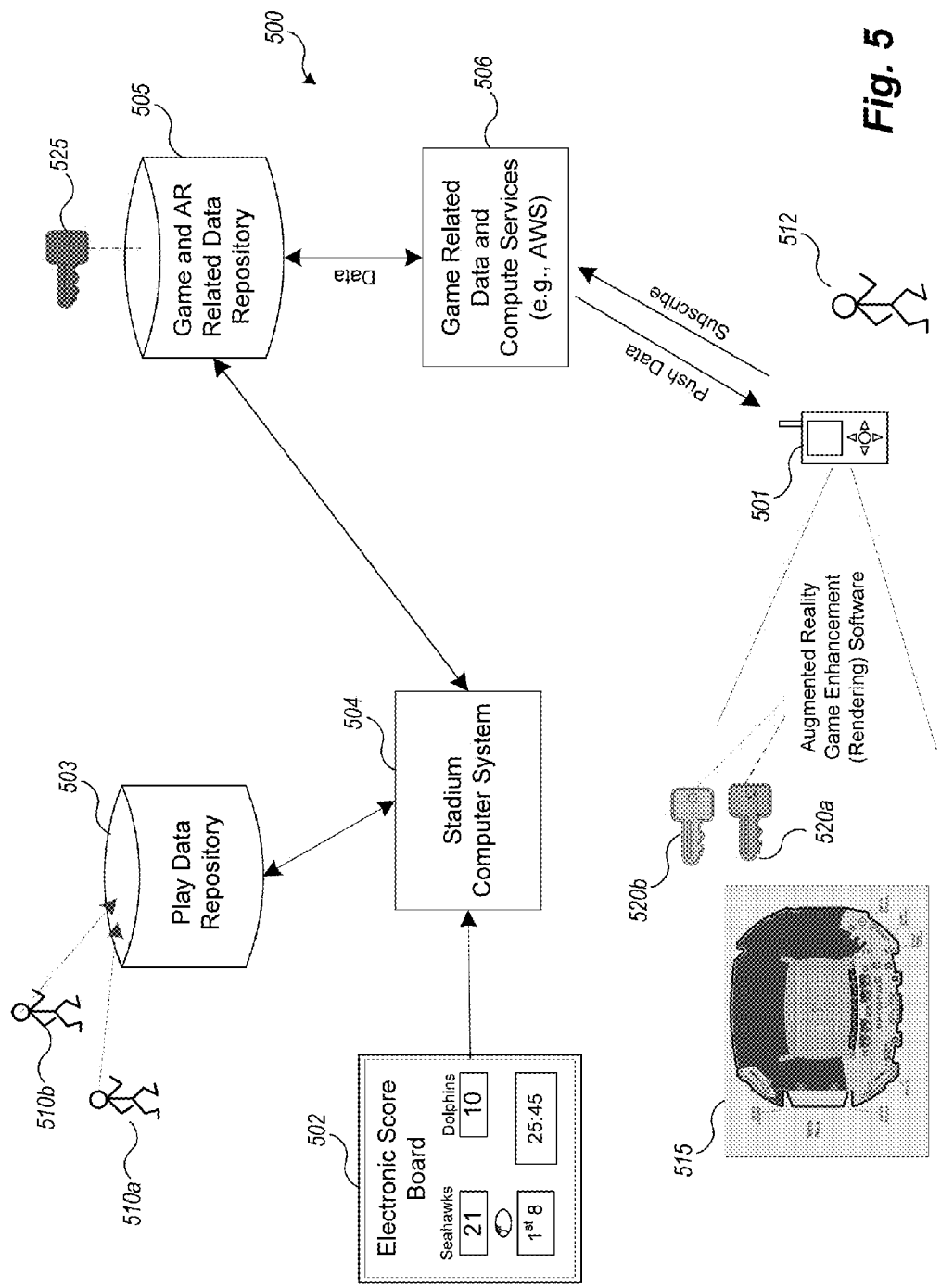

NOTIFICATIONS SCREEN

WELCOME SCREEN

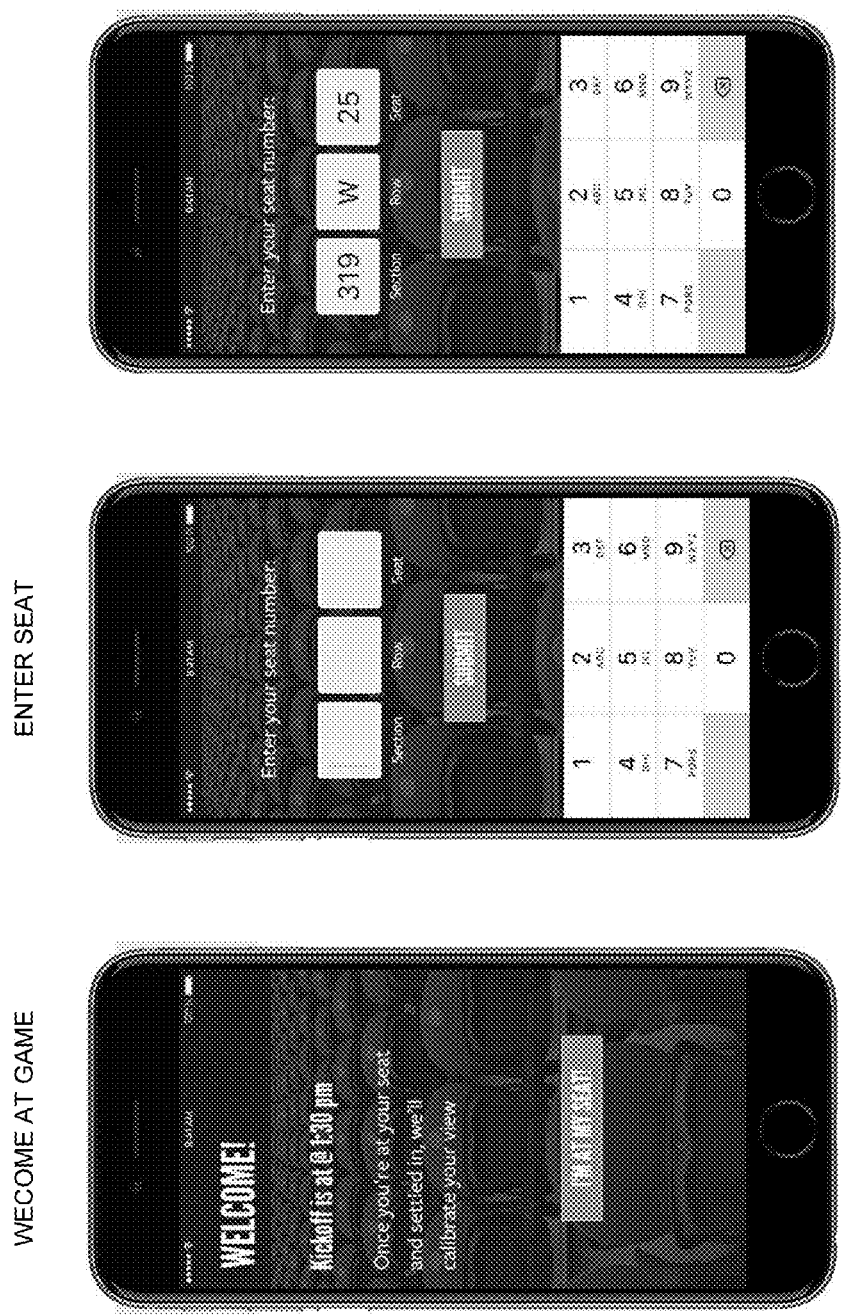

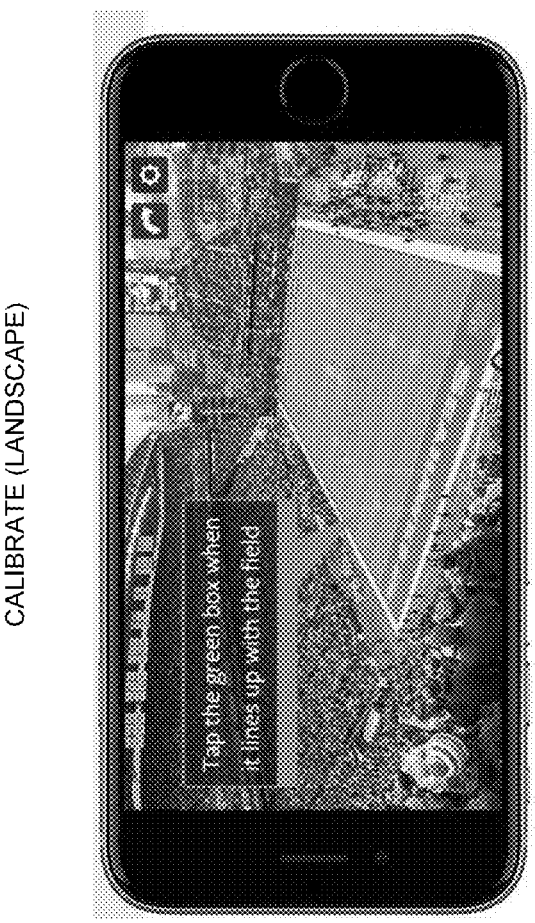
Fig. 6H
Fig. 6G

KEYS TO THE GAME

DRIVE CHART

AD

Fig. 6O
FINAL SCORE
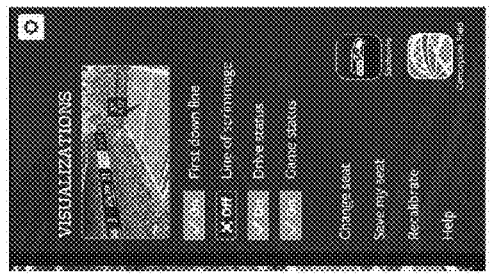
Fig. 6P
SETTINGS
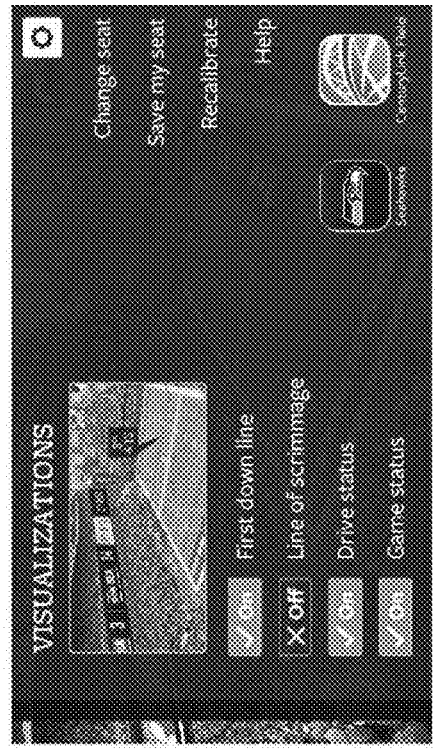

US 10,325,410 B1

AUGMENTED REALITY FOR ENHANCING SPORTING EVENTS

CROSS REFERENCE TO RELATED APPLICATIONS

This application claims the benefit of priority from U.S. Provisional Patent Application No. 62/418,686, entitled "AUGMENTED REALITY FOR ENHANCING SPORTING EVENTS," filed Nov. 7, 2016, which is incorporated herein by reference, in its entirety.

TECHNICAL FIELD

The present disclosure relates to methods, techniques, and systems for using augmented reality to create an enhanced sporting event in a stadium and, in particular, to methods, techniques, and systems for using augmented reality techniques with a mobile device to enhance a live event such as football, soccer, baseball, and the like in a stadium without sacrificing attention on the live sporting event.

BACKGROUND

Technology continues to transform how fans experience live sports. At home, mobile applications have long provided fans watching on TV compelling second (and third) screen experiences, featuring access to new camera angles, instant replay, expert commentary, and rich social features. Adoption has been robust, and there are plenty of application concepts competing for downloads. Augmentation of commercial broadcasts on television programming has become a norm. It is possible to obtain more information when watching a television broadcast of a live sporting event such as football than one would get viewing the event live. This is a downside of attending a sporting event live—one cannot recreate the excitement, noise of the crowd, and the overall feeling obtainable from attending a sporting event in person.

BRIEF DESCRIPTION OF THE DRAWINGS

The patent or patent application file contains at least one drawing executed in color. Copies of this patent or patent application publication with color drawings will be provided by the Office upon request and payment of the necessary fee.

FIG. 5 is an example block diagram of components of an example Augmented Reality Live Game Enhancement System.

DETAILED DESCRIPTION

Figure 1:
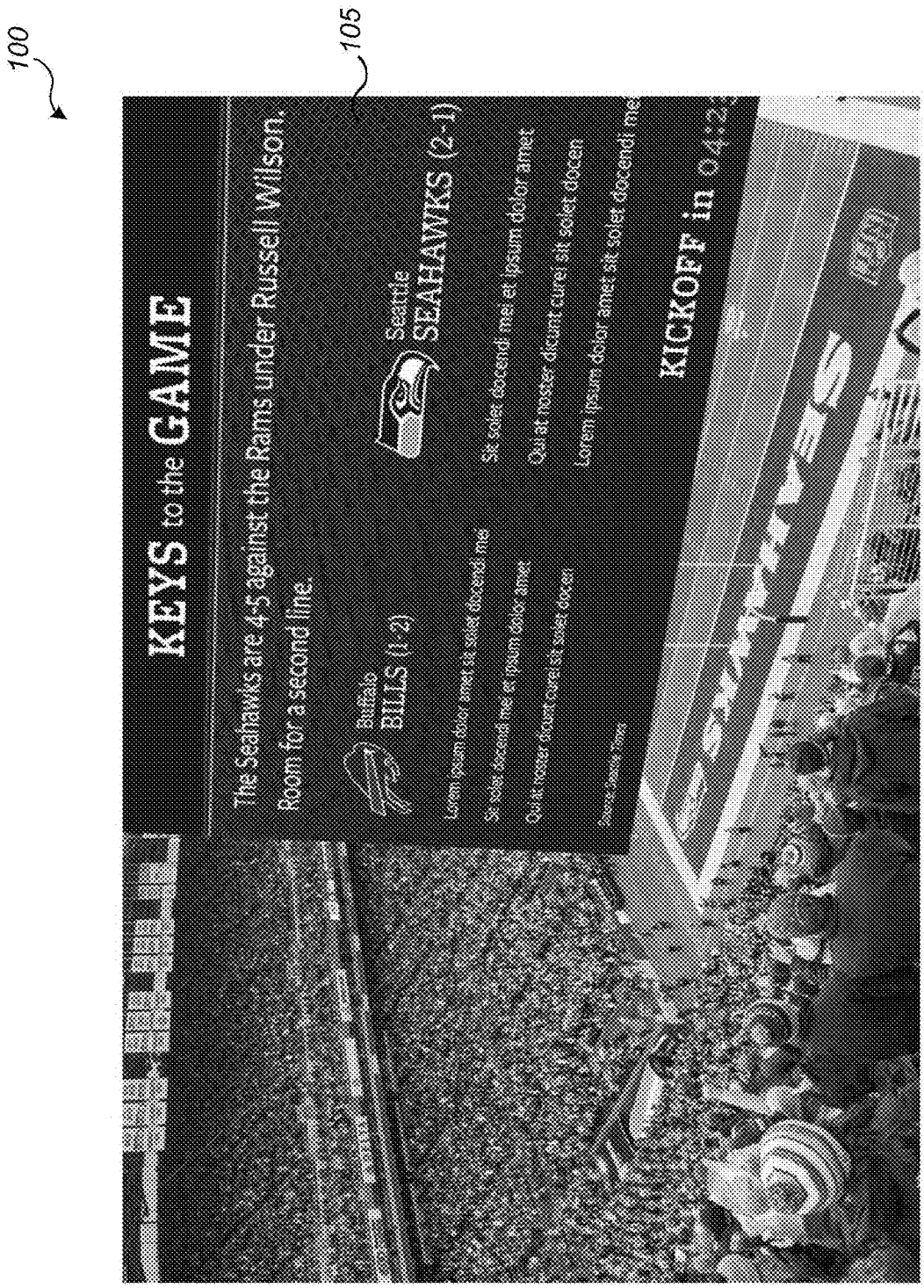
FIG. 1 is a screen display of an example augmentation for a football game produced by an example Augmented Reality Live Game Enhancement System.

Embodiments described herein provide enhanced computer- and network-based methods, techniques, and systems for enhancing a live sporting event using augmented reality ("AR") in real-time (or near real-time). For the purposes of this application, real-time means that delays are not perceptible to a user and that as plays in the sporting event are occurring, the enhancements are taking place. Example embodiments provide a Augmented Reality Live Game Enhancement System ("ARLGES"), which enables users to see augmentations appear as if they are "live" on the sports field as they are watching the game. The user is able to see and interact with these augmentations using his or her mobile device and without taking his or her eyes off of the field. In some deployments, the mobile device is a cellular smartphone with an (optional) modified virtual headset. The user can view the augmentations using the camera of the phone (holding the phone up to look through the camera at the field). In other deployments the user is aided by a virtual headset such as GOOGLE™ Cardboard, or Samsung Gear virtual reality "glasses." Other virtual reality and augmented reality devices, both existing and as developed in the future, may be used with this enhanced AR system to render the augmentations.

Television broadcasting is able to add information, for example, statistics of players and plays, visuals of yards to the next down, etc. because the programming is rendering this information in a known environment. There are fixed camera angles and fixed broadcasting controls. Thus, it is possible in such controlled environments to add content to a user's experiences of watching a game.

At the stadium, mobile applications just haven't been as successful. While mobile device usage is commonplace during breaks in the action, fans have been generally reluctant to use mobile devices during the run of play, as no one wants to miss out on a spectacular play or a pivotal moment in the game.

The new generation of augmented reality applications provided by the ARLGES has the potential to revolutionize how people experience live sporting events. Research has shown that viewers are more confused watching live football in a stadium, for example, versus watching it on TV (28.3% versus 11.6%). In these same studies it was shown that people are interested in football statistics and they want more information when watching a live game at a stadium. For example, respondents indicated that they preferred the superior views provided by close ups, better angles and High Definition TV as well as an appreciation for replays, commentary, statistics ("stats"), and analysis.

It is expected that AR applications can provide all the benefits of today's best sports applications, while making sure that fans don't miss a minute of the action. Using ARLGES, it is believed that AR can provide fans at a live event an experience comparable to—if not better than—what they can see on TV. The goal is not to distract users away from the game, but to keep them focused on it and add an extra layer of information to better immerse them in it.

For example, using the ARLGES, fans at a football game would be able to "see" renderings indicating one or more of:
- the first down line, the line of scrimmage, and other arbitrary field markings
- player names and positions
- player substitutions
- formation names
- traditional player and team stats
- "next generation" player stats (including speed, power, acceleration)
- drive history
- out of town scores without having to look away from the field.

To do this, example embodiments of a ARLGES identify the user the user's position within a stadium, markup live video with one or more salient features related to game action (e.g., the yellow scrimmage line for football); consume game information from one or more 3rd party statistics Application Programming Interfaces ("APIs"); and render information from markup or statistics (stats) in near-real time via a user interface.

Although augmentations are currently available while watching some games on a television program, such as 1$^{st}$ down lines and scrimmage lines shown during a football game, these enhancements are not generally available to a user at a live sporting event while still being able to watch the game live. Further, enhancements currently available are rendered using fixed camera positions and are not user specific nor user controlled.

In some example embodiments, to be able to allow a user to use augmented reality while viewing a live sporting event in a way that enhances the viewing experience, the rendering system detects and tracks, in real-time, where the user's view is relative to the stadium field and corrects for lighting effects dynamically as the chromatic makeup of the view changes in real time. For example, as the sun goes down or changes over time, in some embodiments the ARLGES accounts for differences in color and shadows in order to render objects such as scrimmage lines, enhanced scoreboards, etc. as the user would expect (e.g., in the right "z-order" from front to back) so that, for example, when the user holds up his hand he sees the scrimmage line over the field instead of over his hand. In computer graphics, this process is known as hidden surface removal and occlusion culling (or line occlusion). The environment of the ARLGES poses problems because each user is viewing the stadium from his or her own camera angle and the lighting is different from each seat in the stadium. Typical commercial solutions, such as commercial TV broadcasts, rely on the existence of certain known information, such as having cameras at known, fixed locations. To overcome such problems, the ARLGES performs techniques for calibrating on a per user basis in real-time (or perceptively real-time) and for rendering continuously the augmentations using specialized computer rendering techniques which provide desired occlusion and hidden surface removal.

FIG. 1 is a screen display of an example augmentation for a football game produced by an example Augmented Reality Live Game Enhancement System. In FIG. 1, screen 100 shows an augmentation 105 visible to a user on the football field when the user looks through his or her VR googles or phone. Augmentation 105 is a "Jumbotron" (large-screen television equivalent typically used to show close up shots at an event or concert).

The Jumbotron in the middle of the field shows one screen's worth of pre-game information for the user to read before the game starts. This infographic contains the following features:
- Logos/art for each team.
- Title of the infographic: "Keys to the Game"
- A two-line unlabeled text field for a miscellaneous sentence about the significance of the game (a "game summary").
- Each team's record.
- Room for three one-sentence "Keys to the game" for each team (6 total).
- Inform the user that the game starts in MM:SS (04:23)
- A field for the "Keys to the Game" data source ("Source: Seattle Times").

Figure 2:
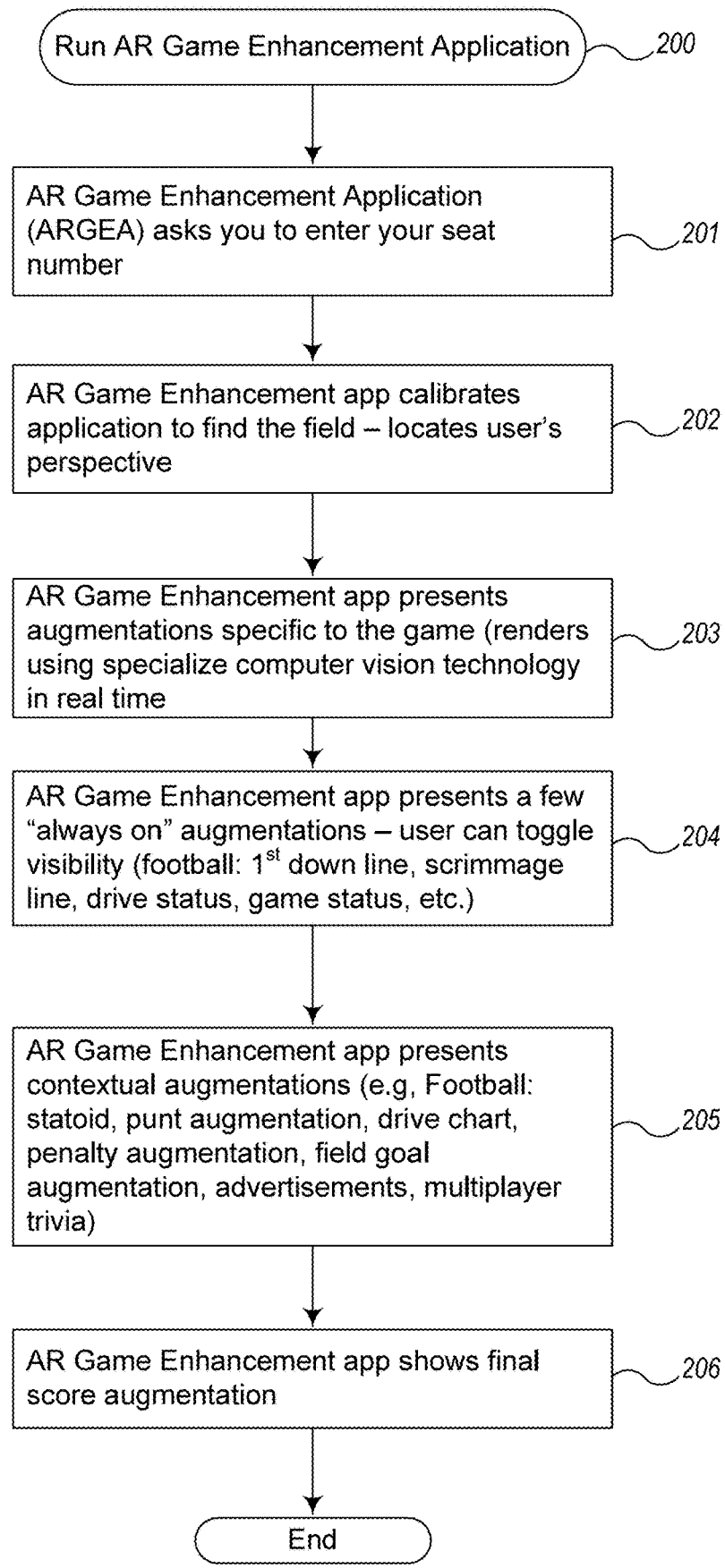
FIG. 2 is an example flow diagram of an example AR Game Enhancement Application implemented according to the principles of an ARLGES described herein.

FIG. 2 is an example flow diagram of an example AR Game Enhancement Application implemented according to the principles of an ARLGES described herein. AR Game Enhancement Application 200 begins by requesting the user to enter seat information in block 201. This is for the purpose of capturing a user's three dimensional location within the stadium. The user's seat number is mapped to (x, y, z) coordinates within a 3D model of the stadium. Once mechanism for mapping user positions to 3D coordinate space is discussed further below. In block 202, the application calibrates itself based upon user input (such as visually panning the camera of the client device) until one or more fixed landmarks are identified. For example, the user may be asked to place a visual of the field represented by a rectangle within the camera's lens view and indicate when it is found. (See, for example, FIGS. 6G and 6H described below.) In one embodiment, a green rectangle in perspective is displayed to the user and the user is requested to indicate (e.g., via tapping on the green rectangle) when it lines up with the field. This information may be used by the graphics rendering engine (e.g., in some embodiments executing on the client's mobile device) to produce a model of the stadium field. In blocks 203 and 204, the application presents various augmentations as described in detail below. These can be "always on" types of augmentations like scrimmage lines, game status, and the like, or contextual augmentations such as penalty and punt augmentations, advertisements, player stats, and the like. Some of these augmentations may be visible based upon user settings. In block 206 the application may show a final score augmentation and other information.

Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a Augmented Reality Live Game Enhancement System to be used for using AR in live sporting event environments. Other embodiments of the described techniques may be used for other purposes, including for live concerts, presentations, and the like. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Overview of an Example ARLGES

System Architecture

Figure 3:
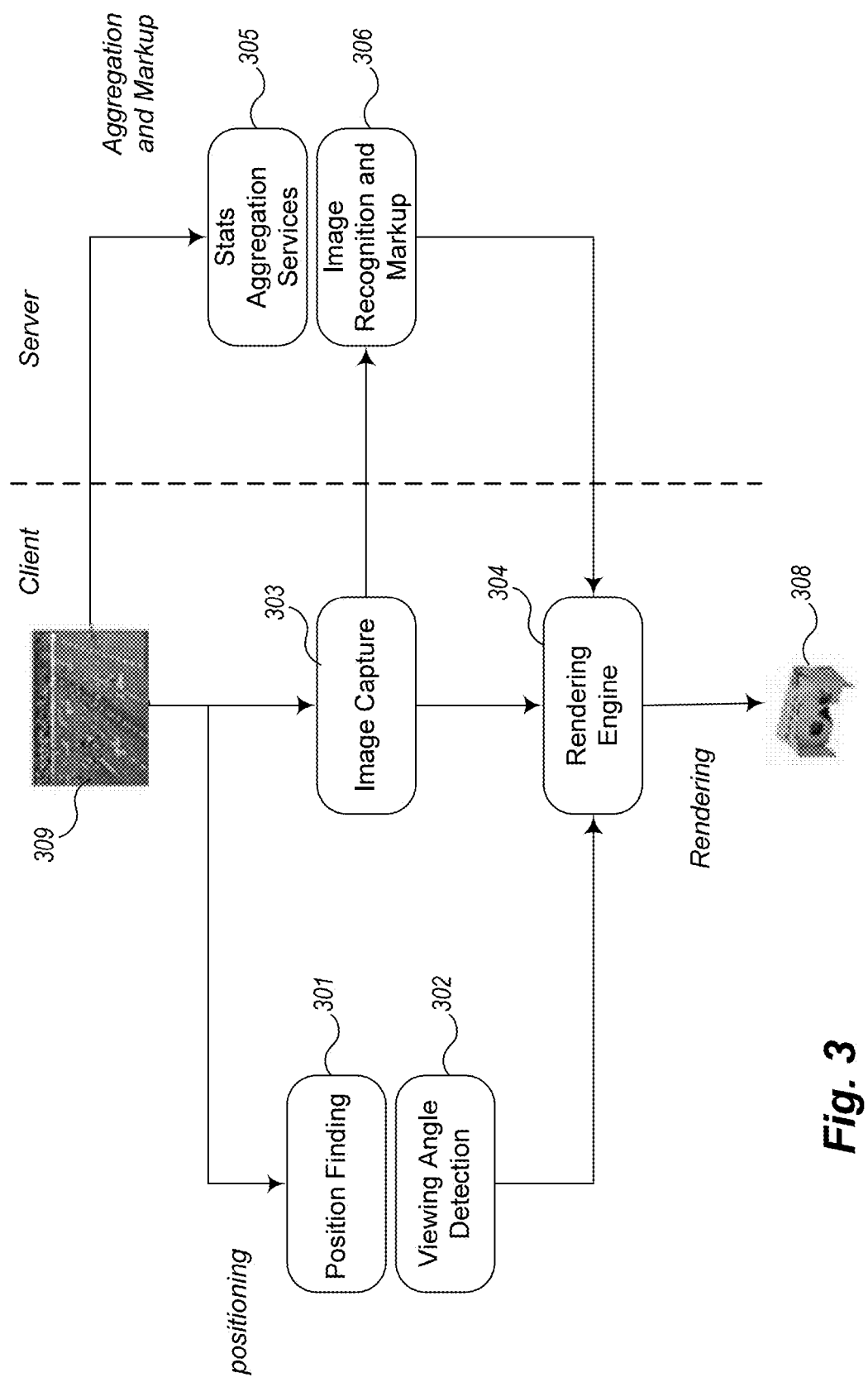
FIG. 3 is an example of the system architecture of an example Augmented Reality Live Game Enhancement System.

The ARLGES comprises four basic systems: (1) a position finding system, (2) a data aggregation service, (3) an image markup engine, and (4) a rendering engine. A block diagram of the an example ARLGES system is illustrated in FIG. 3.

A set of client-side positioning services 301 and 302 are used to identify where a user is located in the stadium; these services provide inputs to the rendering engine 304 on how/where to display image markup on the visible image 309. A client-side image capture service 303 is used to capture frames from the images being displayed to the user on the AR headset 308. These images are then sent to a server-side image recognition and markup service 306 which identifies salient features in the image 309 (either using via computer vision techniques or as informed by the stats aggregation service 305).

A markup is then sent back to the client's rendering engine 304, which combines information about the individual images with information about the user's position to mark up the user's field of view 309.

Although some services may need to be deployed on a cloud-based server, latency may require all of the services illustrated above to operate on a client-only architecture.

Live Video Capture

Video capture can be performed using any modern smartphone.

While the first dedicated augmented reality glasses (like Microsoft's Hololens or Magic Leap) may make a debut in 2016, it is likely that they won't be ready for widespread consumer adoption until 2018 at the earliest. In the meantime, ARLGES uses a custom version of Google's virtual reality headset, Google Cardboard, as the platform for this app. (Google Cardboard uses a smartphone, in conjunction with a cheap, mostly-cardboard headset rig to display VR content.)

Cardboard is modified in order to expose the rear-facing camera on the user's smartphone in order to capture video that can be used as the input to our AR system.

User Positioning

Options for determining the user's position and orientation within the stadium are explored below in the section on calibration.

Content Markup

An example embodiment of ARLGES includes a software service capable of graphically tracing any yard line on a football field from any viewing angle within a stadium. This feature can be used to mark up arbitrary lines on the field (such as the first down line or line of scrimmage) or can be used to precisely annotate features on the field (such as past plays run on this drive).

Figure 4A:
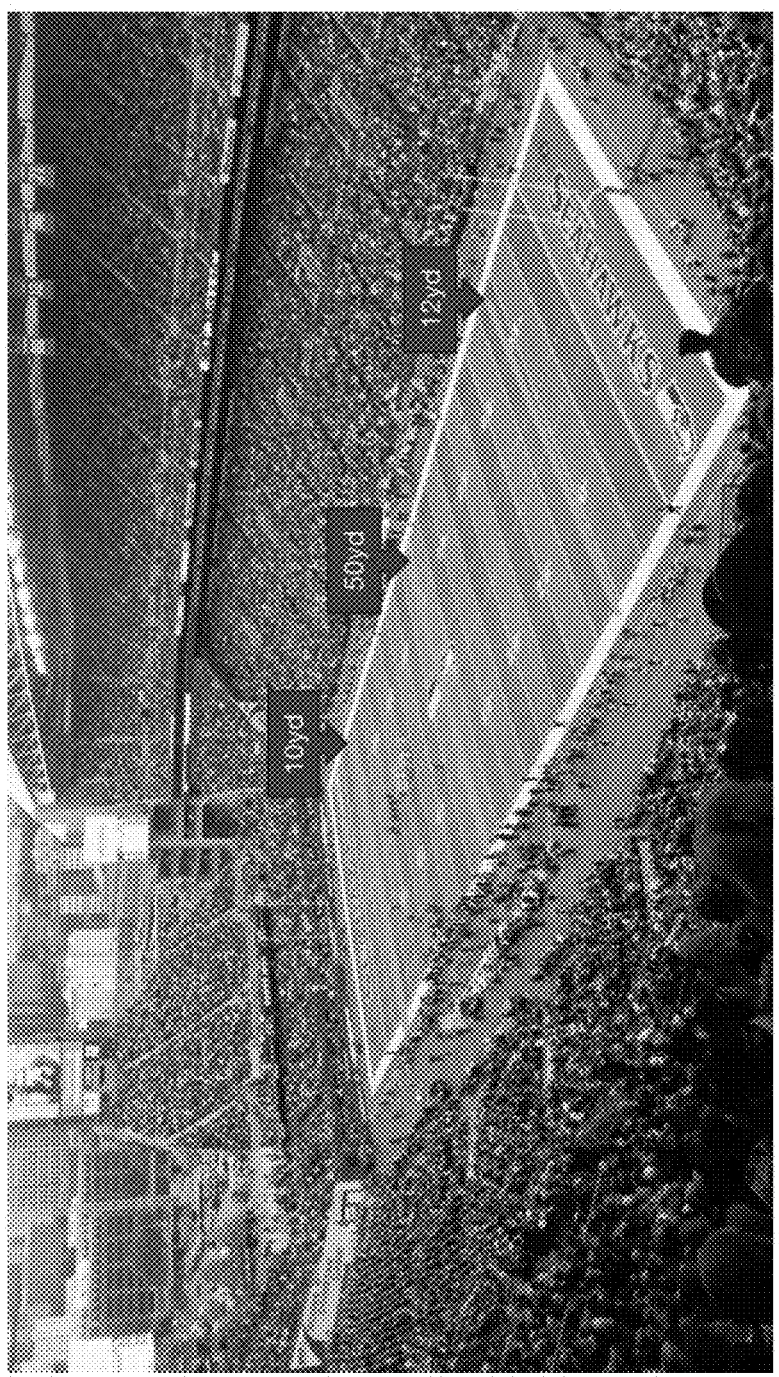
FIGS. 4A-4J are example augmentations that can be employed in an Augmented Reality Live Game Enhancement System.

FIG. 4A is an example of an image augmentation of content markup. For example, the image in FIG. 4A shows three yard lines (i.e. the 10 yard line, the 50 yard line, and the 12 yard line) highlighted from the perspective of a seat in the southwest corner of CenturyLink Field.

Figure 4B:

FIG. 4B is an example of an image augmentation of content markup from a different user position. The image shown in FIG. 4B shows the same yard lines highlighted from a seat in the northwest corner, upper deck of the same stadium.

Figure 4C:

Completion of this task also requires the system to recognize when a yard line cannot be recognized from the user's current viewing location. For example, while the 50 yard line is visible from the user's perspective shown in FIG. 4C, the 10 and the 12 yard lines are not and therefore are not be rendered.

API Integration

Some embodiments of the ARLGES use a data service based on the STATS Inc. NFL real-time statistics API. Data from this service can be used to formulate augmentations.

User Interface

Some embodiments leverage only the existing touch controls available on Google Cardboard. Other embodiments offer a more extensive user interface.

Example Augmentations in an Example ARLGES

First Down Line

Figure 4D:
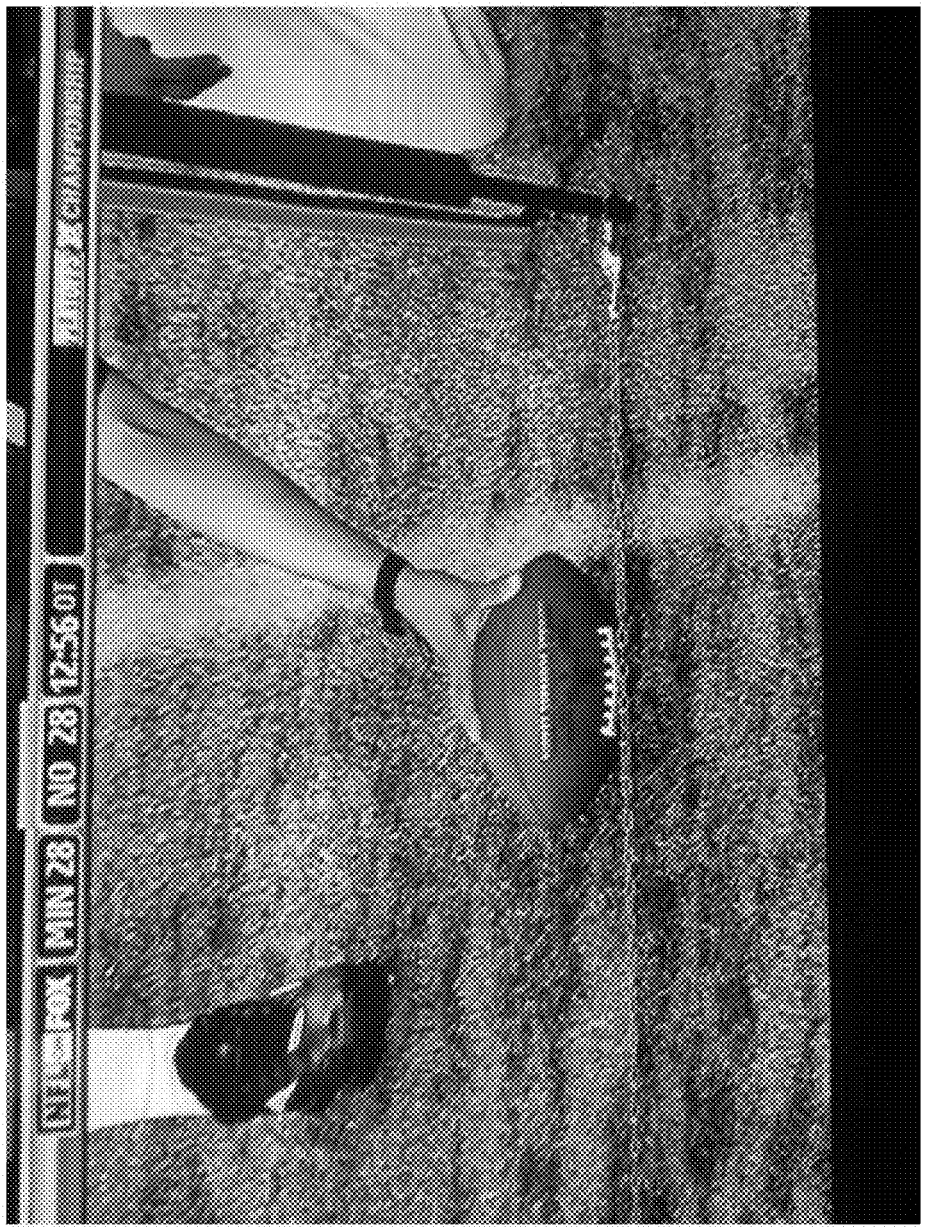

The "first down line" augmentation appears as a line on the field, indicating how many yards away from a first down. FIG. 4D is an example of a first down augmentation. At any point during the game, the user can point their phone at the field and see a colored line rendered on top of the field as indicated in FIG. 4D, indicating the spot the offense must cross in order to get a first down.

Statoids

Figure 4E:

Statoids comprise 2D graphical and text-heavy statistics elements that appear automatically based on the context of the game. When a player makes an interception, a "statoid" may appear that informs the user how many interceptions that player has made this season. FIG. 4E illustrates an example of a statoid augmentation.

The stats are relevant to what is happening in the game at any given moment, and allows the user to understand why a play or event may be particularly interesting. Statoid overlays make fans feel knowledgeable when conversing with friends.

Drive Chart

Figure 4F:
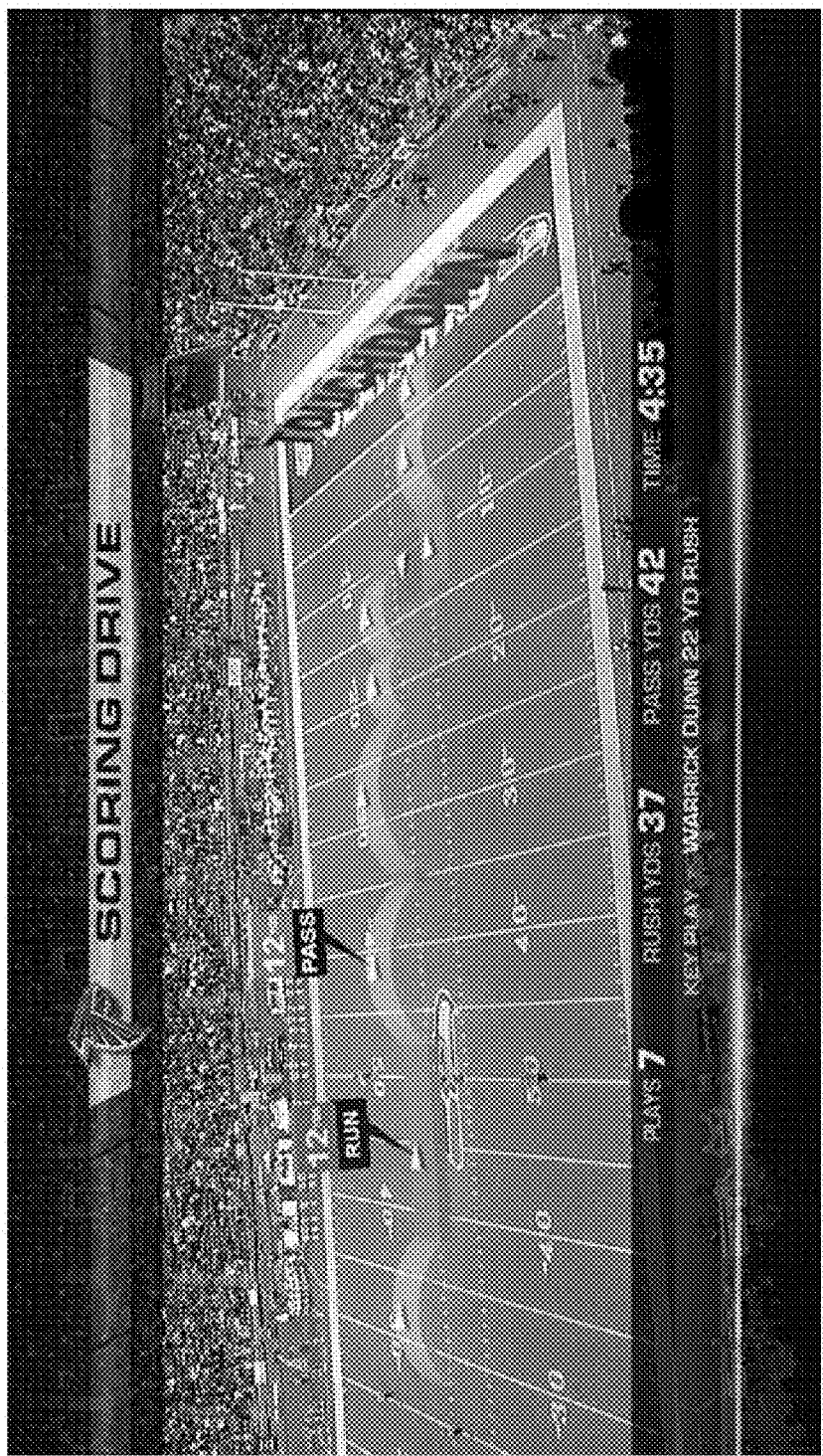

A drive chart augments the field with arced arrows that indicate how a team's drive has played out. Fan can visually see the passes and runs that have contributed to yards gained and lost. FIG. 4F is an example of a drive chart augmentation.

Drive charts are also useful for catching a fan up on plays that they have missed while they were in the bathroom or getting food.

Example graphics include:

Punt: A (potentially dotted or dashed) arced line from the line of scrimmage to the location where the receiving team was downed. The line can be rendered in the team's primary color.

Successful field goal: A dotted half-arc that starts at the line of scrimmage and ends the arc's peak between the field goal posts. There may be exciting text, for example, that says "Field goal!"

Failed field goal: A dotted arc that ends where the defense gained possession.

Touchdown: There may be exciting text in the defense's end zone, for example, that says "Touchdown"

Fumble: There may be text at the point of the fumble, for example, that says "Fumble".

Interception: There may be text at the point where the defense was downed, for example, that says "interception".

Safety: There may be exciting text in the offence's end zone, for example, that says "Safety".

Play Visualizer (Xs and Os)

Figure 4G:
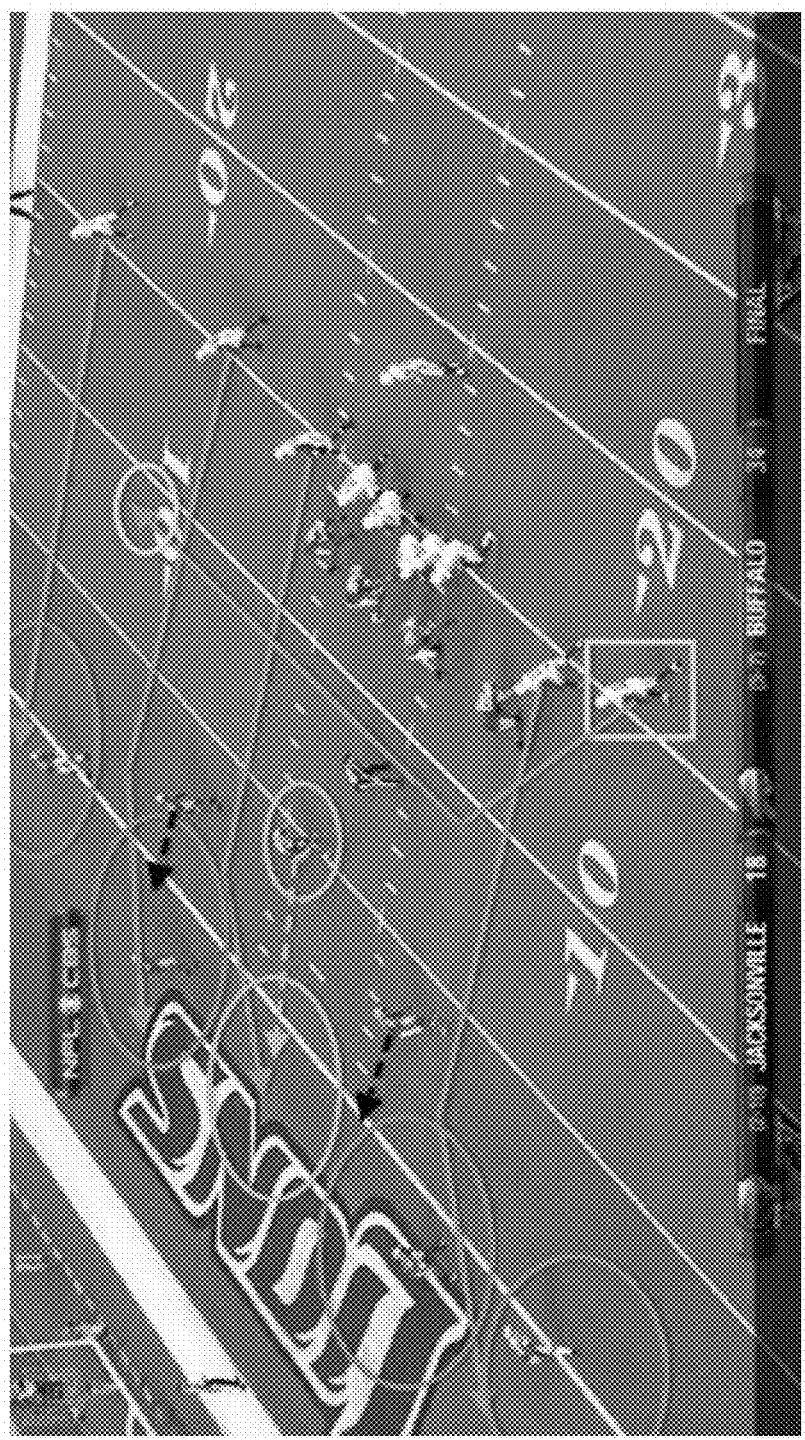

Sometimes a user wonders what play a team just ran, or what an "I-formation" is. Using this augmentation, the user can visualize plays just after they happen using the familiar "X"s, "O"s, boxes and/or arrows. FIG. 4G is an illustration of a play visualizer augmentation.

The play visualizer may help fans learn the complexity surrounding formations and play calling, and help them understand it in the context of the field they're looking at.

AR Ads

In AR, there is usually extra advertisement (ad) real estate because one can overlay a virtual advertisement on top of the crowds.

Figure 4H:
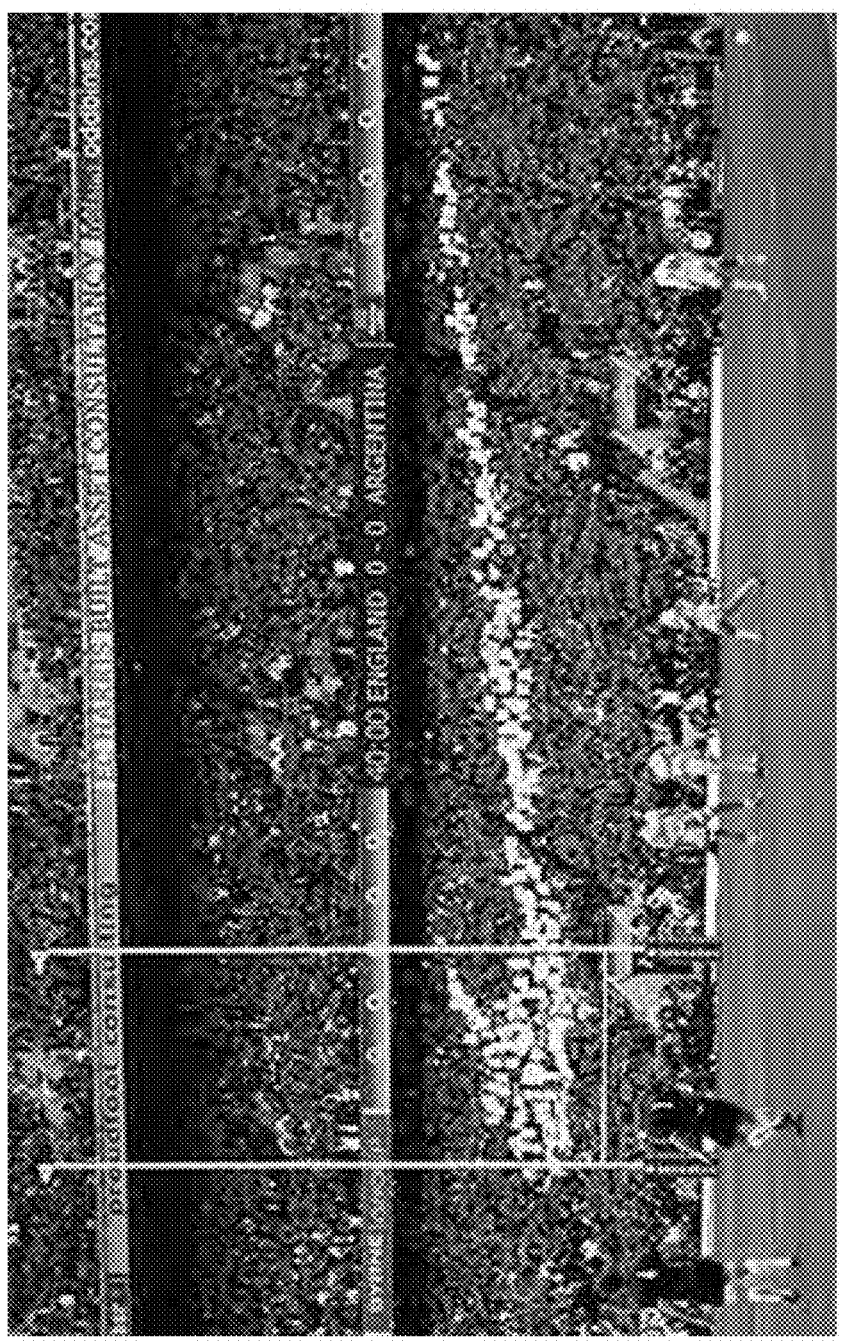

For instance, Oberto or some other company could have a massive banner of their logo overlayed on top of a set of seats (such as the eastern 100 level seats at CenturyLink stadium) for a period of time. FIG. 4H is an example augmentation of ad support. The ARLGES can include support for interfacing to advertisers and the like to buy advertising space, compete with other advertisers, and the like.

Field Goal Kick Heatmap

An on-field augmentation that visualizes the makes/misses that this kicker has had this season.

This augmentation is presented in one embodiment during fourth down situations where the offense is in field goal range.

Also other stats about the kicker/kick can be displayed at this time.

Drive Status

Figure 4I:
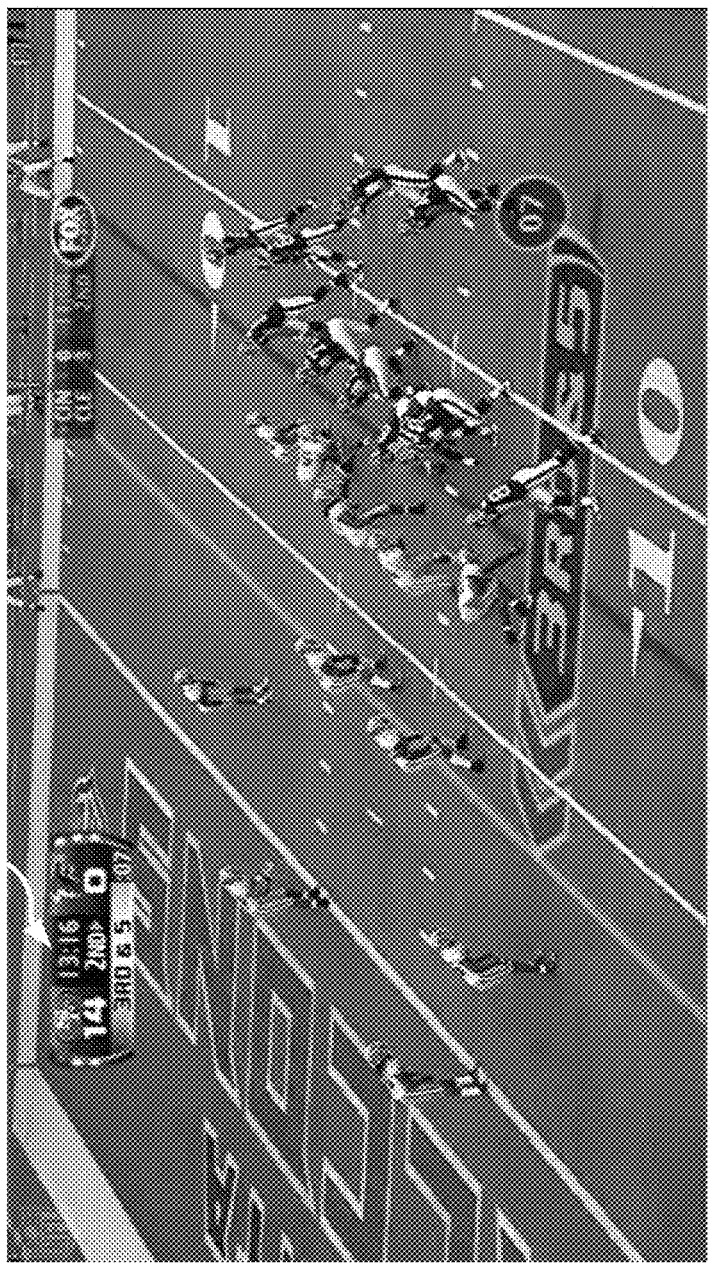

FIG. 4I is an example of an on-field augmentation. On-field augmentation 410 displays the current down (e.g. 2nd and 6) and the direction of the drive. It can include the play clock too.

Loudness Meter

Figure 4J:

FIG. 4J is an example of an augmentation that displays a loudness meter. The meter in 4J demonstrates use of the phone's microphone to measure the DB levels of the user's area. The user can then visualize a level/meter/bars that indicate the loudness of each section in the stadium as one views the crowd through the user's mobile device.

Additional Augmentations

Many other augmentations can be created and displayed. For example, the following augmentations may be made available to users:

Find My Friend/Find the Winner of a Prize

When a user holds up his or her phone, a geolocation pin is provided as an augmentation to find something, for example, a friend or find the winner of a stadium raffled prize.

Empty Seat Locator

Find unoccupied seats in the stadium.

Multiplayer Trivia (Classroom Clicker-Style)

During commercial breaks, fans have the option of participating in team trivia. Answers/results are collected in real time, and extra points are given for answering quickly. After answering, fans are shown an advertisement while remaining results are collected. They can then compare how they did with the aggregated results across the stadium.

Example Architecture for an Example ARLGES

FIG. 5 is an example block diagram of components of an example AR Live Game Enhancement System. In one example embodiment, the ARLGES comprises one or more functional components/modules that work together to provide augmentations to a live sporting event such as a football game. For example, an example embodiment of the ARLGES provides augmentations at a football stadium although other implementations may be provided for other purposes—sporting events or other types of events such as concerts, speaking events, and the like. In the example ARLGES shown in FIG. 5, the ARLGES 500 comprises a stadium computer system 502 which takes data from an electronic score board 502 and a data repository for game plays 503 and provides (and stores) this data to a game and augmented reality data repository 505. A client AR application for rendering augmentations on stadium field 515 executes on mobile device 501, which is controlled by user 512. The client AR application receives data for rendering from a cloud computing based Game Related Data and Compute Services 506, which communicates with the game and augmented reality data repository 505 to receive game specific information.

More specifically, the stadium computer system 504 may be located on the stadium premises in order to provide a physical connection to the electronic score board 502 and/or the play data repository 503. In many sports event environments, multiple vendors (typically human beings 510*a*, 510*b*) provide descriptions of the game plays, penalties, and other information, which is stored in the play data repository 503. The data repositories described herein may be in the form of a database, file, cloud based data store, or the like. These vendors may be located on premises in the stadium. In addition, in some environments, the score board does not support an API or other external connection to game data. Thus, it can be beneficial (for speed reasons and otherwise) to have the stadium computer system 504 local to the stadium environment to communicate with these components. In other environments, the play information stored in the play data repository 503 and/or score board 502 may be provided electronically and the stadium computer system 504 may be located external to the stadium and communicate via a communications network (e.g., the Internet) with components 502 and 503.

The score board, for example for a live football game, provides information such as the game clock, an indication of who has possession of the ball, the current quarter, the down status (e.g., 1st and 10), the current scrimmage line and the play clock. Other information may be available and depends upon the event.

The game and augmented reality data repository 505 receives the game play and live game information from the stadium computer system 504. The game and augmented reality data repository 505 also stores master chroma keys that are used to determine the background color from the user's device as described below. The one or more master (or global) chroma keys 525 are general keys used to identify the background color(s) (of the field) for computer rendering purposes. In one embodiment they are provided by the software services that support the AR application running on the client. These master keys may be automatically reset at different times, for example, if they are generated from known cameras or based upon known locations.

More specifically, master chroma keys 525 represent, in at least one embodiment, a representation of the range of colors of the playing field (e.g., ranges of green) as seen by a camera that is used to determine whether an image captured by the camera be rendered in front of or behind augmentations projected on the playing field. For example, a first down line may be rendered in front of (or over) the playing field while a person walking on the field would be rendered in front of (or over) the first down line augmentation.

One or more chroma keys 520*a*-520*b* can also be incorporated that are unique to each mobile device and may change dynamically over time (be recalibrated). Each mobile device generates its own chroma keys based upon the particular position and orientation of the mobile device to the field. These can be replaced dynamically during game play to keep up with the changing lighting conditions or based upon other events. In some embodiments, these user chroma keys 520*a*-520*b* (per device) are recomputed continuously by the techniques described below for use in determining a background upon which the rendering of augmentations are placed.

The AR application runs on a mobile device 501, which is associated with (e.g., held by) client 512 and, at least in one embodiment, does the majority of the rendering for the augmentations to be displayed "on" the stadium field 515. As described the mobile device 501 may optionally include goggles or another viewing device. The AR application running on mobile device 501 receives the game and game play data from Game Related Data and Compute Services 506. In some embodiments this is a software service, for example, hosted by a web/cloud service such as AMAZON™ Web Services (AWS) cloud computing services (or MICROSOFT Azure) which provides computing services over a network. The AR application subscribes to services from Game Related Data and Compute Services 506, and data for example, the plays, master key calibration information, and the like, is pushed to the client application running on the mobile device 501. Game Related Data and Compute Services 506 retrieves particular data stored in game and augmented reality data repository 505 to retrieve necessary game, calibration, and other data in order to adjust the augmentations to be rendered on the client mobile device 501.

In applications related to non-sports events such as music or speaking events, several of the component may not be present or available or may be different. Techniques of the ARLGES may still be used to augment those live events.

Example User Interface in an Example ARLGES

One example embodiment of the ARLGES is a football game AR application referred to as ARFX. It is understood that the techniques described here may be used for any live sports event, including for example, for football, soccer, baseball, golf, and the like. In addition, although an example user interface is described herein, it is to be understood that different actions or additional actions or different user interfaces may be provided as desired.

Figure 6C:
FIGS. 6A-6P are example screen displays on a mobile device running an augmented reality football game application implemented according to principles of an Augmented Reality Live Game Enhancement System.
Figure 6B:
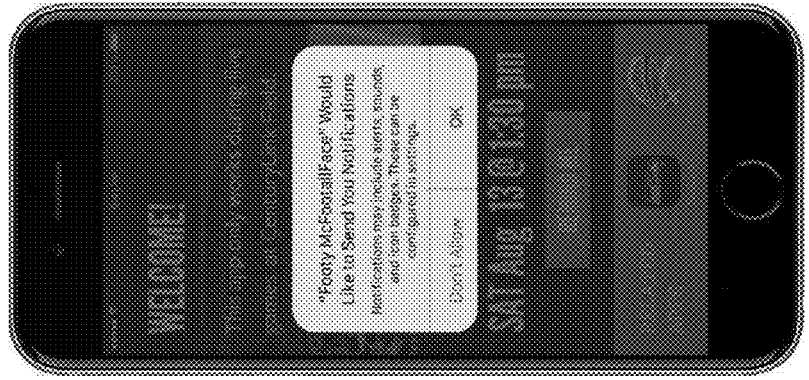
Figure 6A:
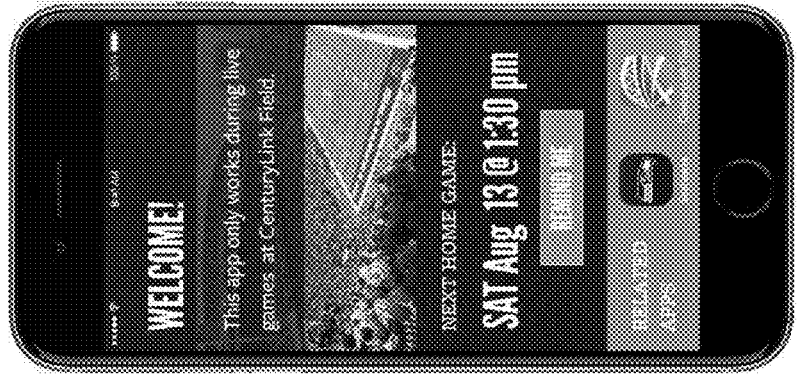

FIGS. 6A-6P are example screen displays on a mobile device running an augmented reality football game application that is an implemented according to principles of an Augmented Reality Live Game Enhancement System.

FIG. 6A is a welcome screen that inform the user when and where to use the app; offer reminder feature; show related apps. It gives the user something to do with the app from the home screen, even when not at a live game. It allows the user to explore the app's possibilities from the Welcome screen, with in some embodiments a link to an app tutorial that shows sample screens of what the app can/will do, the app's special features, etc.

FIG. 6B is a notifications screen that allows the user to decide if they want to receive notifications from the app. After the user enters inputs, FIG. 6C shows a return to the welcome screen.

FIGS. 6D-6F informs the user to get to their seat and let the app know what the seat is before continuing use in order to calibrate the application.

FIGS. 6G-6H informs the user to turn the phone to calibrate the app with the person's actual view while holding their phone in portrait view and then in landscape view. The application needs to calibrate the app with the person's actual view while holding their phone in portrait view and then in landscape view. In some embodiments only one of portrait and/or landscape calibration is needed.

Figure 6I:

FIG. 6I displays background information about what each team needs to do to win and anticipated challenges they may face.

Figure 6J:
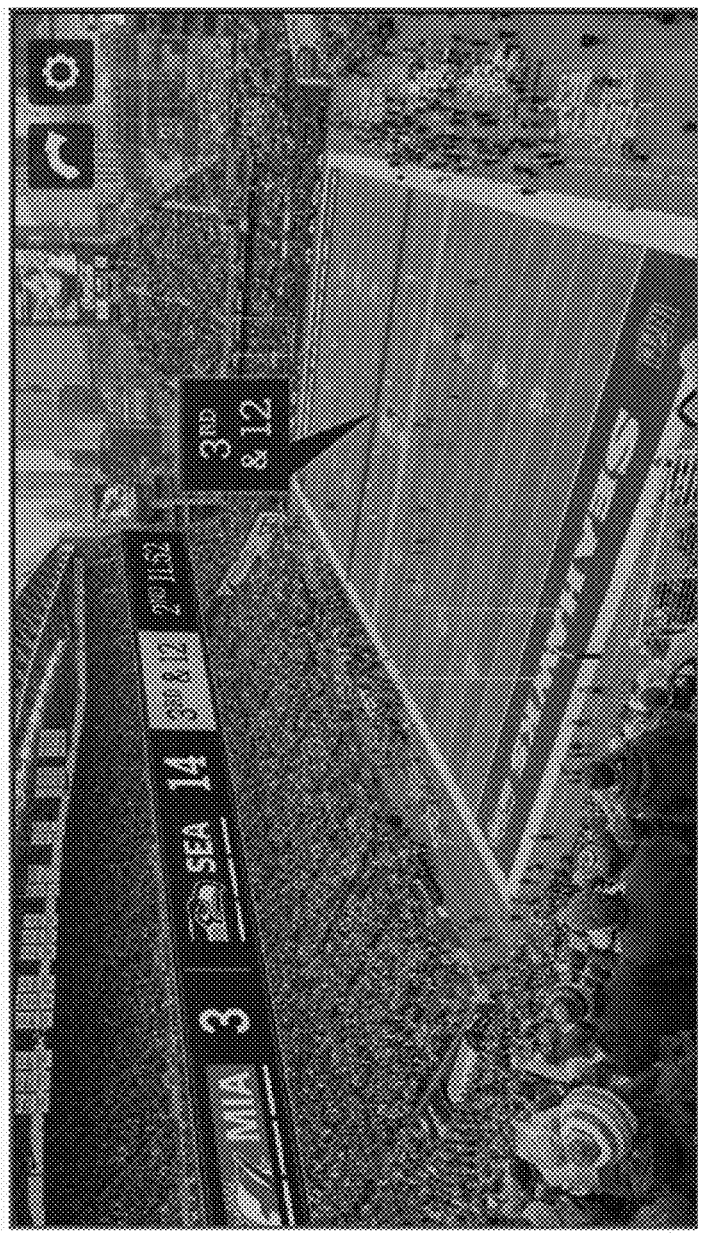

FIG. 6J displays what are considered basic augmentations during the game, for example, first down line, scrimmage line, drive status and game status. In some embodiments, this includes showing lines where the players are running, ability to see a replay, allow user to touch a player and their name/number would pop-up, and offer the ability to see other games and monitor fantasy football players. In some embodiments, the basic augmentations can be toggled on and off. FIG. 6P displays an example of a screen allowing the user to do this.

Figure 6K:
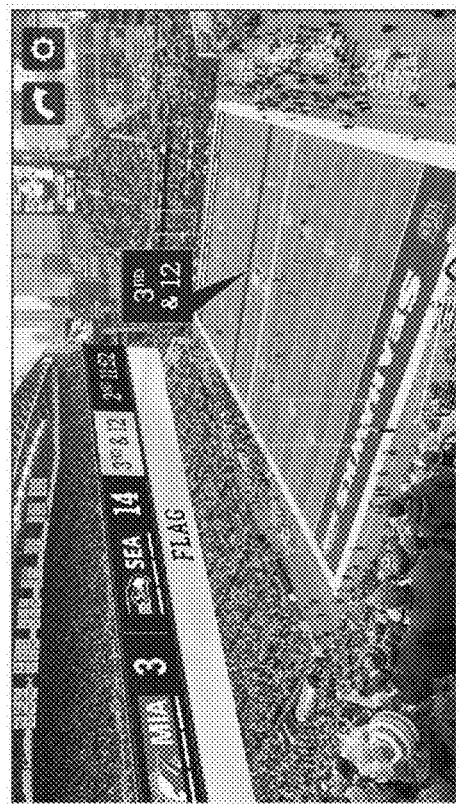
Figure 6L:
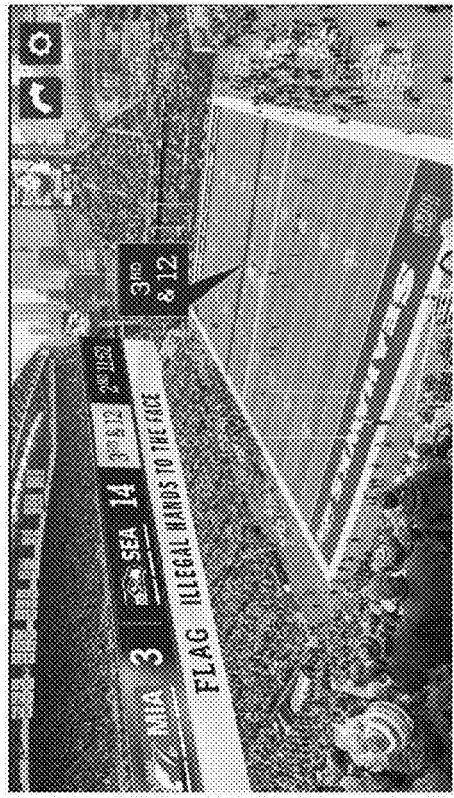

FIGS. 6K and 6L inform the user that there is a penalty and the reason for it. In some embodiments, the user can click on the penalty information to see whose penalty it is and to see a replay.

Figure 6M:
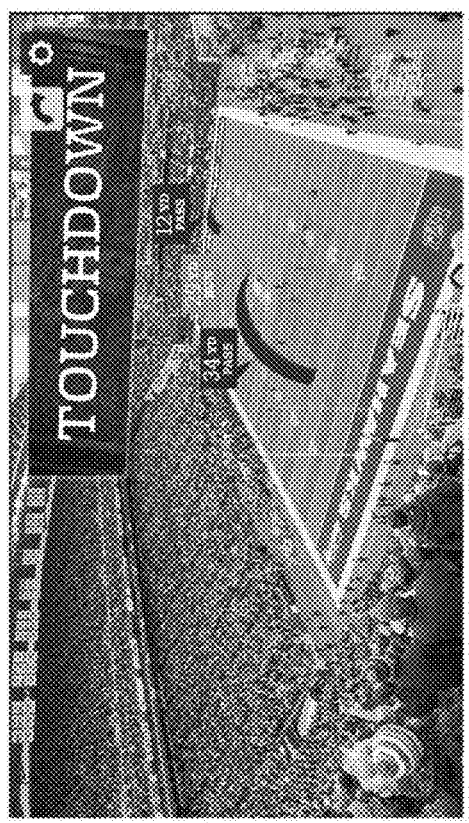

FIG. 6M is an example drive chart that shows the user the sequence of events during the last drive, which is especially useful if the user missed a play. In some embodiments additional features are available such as replay, location of play, additional details of the play, and the like.

Figure 6N:
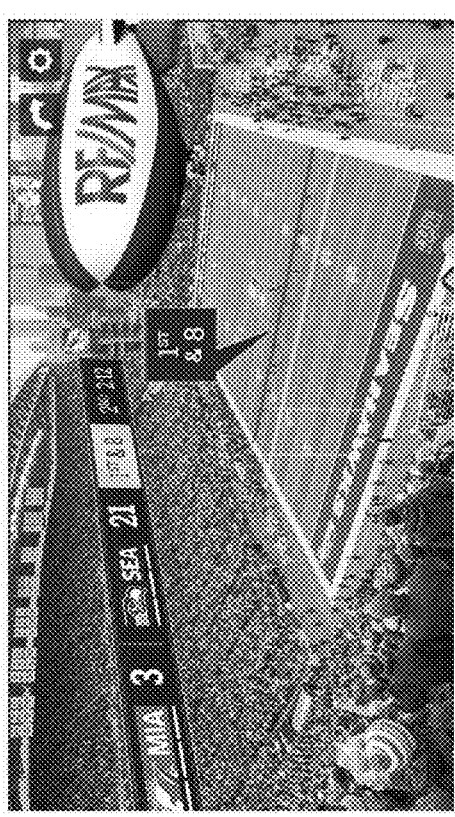

FIG. 6N displays one or more advertisements (ads) to the user. In some embodiments, the user may toggle off these ads.

FIG. 6O is an example of a final score augmentation displayed like a Jumbotron.

FIG. 6P is an example user interface allowing a user to set what augmentations they see and to alter other information previously entered. In some embodiments the display includes icons, words, and/or other graphics. The settings may be manipulated in portrait or landscape view.

Calibration—3D Positioning in a Live Stadium Context

As described earlier, calibration of the augmentation application in a live event environment is difficult for a variety of reasons. First, the view is not from a known camera position as is the case with current TV augmentation, thus angle, distance, location and/or other information is not necessarily known for the camera providing the video feed.

Accordingly, the ARLGES needs to compute where the user is located in the event forum (e.g., the stadium) before calibrating the application to determine where the field is so that drawing augmentations are as accurate as possible. The seat location is mapped to a three dimensional position in the stadium—that is a latitude, longitude, and altitude, which indicates a position relative to the field (lat, long, alt). The ARLGES also computes a user's orientation, measured as a normalized 3-dimensional vector (or equivalently, a quaternion) pointing in north/south, east/west, and elevation. The user's position and orientation is a "pose" which can be described in a single mathematical structure as a 3×3 rotation matrix.

In order to compute the (lat, long, alt) position, it is necessary to map each seat. A seat processing tool in the ARLGES is employed to do this. The seat processing tool interpolates the positions of unmeasured seats via the known seat positions and generic spacing measurements. In most stadiums, the seat distances are not precisely uniform, thus the determination of the position using interpolated date may potentially cause some errors, which need to be accommodated by the rendering system.

In one embodiment, some number of seat positions (or all) are determined by known survey techniques. A seat's position is then derived by determining (e.g., calculating) a directional vector between two known seat positions or, in some embodiments from or to a known seat positions and one derived using other techniques. This position (lat, long, alt) is a position relative to the stadium field. It gives a starting point for the ARLGES to know what augmentations are useful or accurate. For example, if a user is sitting in particular places in the stadium, the size of a virtual scoreboard may be scaled accordingly.

During play, the user's mobile device is held up to render the augmentations. Thus, the user's actual position varies from the earlier determined seat position and has an orientation associated with it. Mobile devices typically have sensors such as gyroscopes, cameras, accelerometers, and magnetometers (compasses) that can be used to determine orientation data. Thus, after a user's pose (position and orientation) is determined, this information can be used to render the augmentations as accurately as possible using the camera of the mobile device.

Of note, the determinations are estimates and information provided by the sensors can vary, such as due to errors and the limits of the accuracy of the sensors. The application accounts for these errors (known as drift) by tracking where the corners of the field are and adjusting for the difference between the detected (observed) corner from camera and computed corner based upon the pose estimates. More specifically, the application may use the mobile device's camera to generate video feeds of the corners of the playing field. These video feeds are analyzed by the application to determine where, relative to the viewpoint of the mobile device, the camera is viewing the corners of the field. The results are then compared with the application's model of the expected corners of the field (based upon, for example, the initial calibration) to correct error in the expected position and orientation of the field relative to the mobile device. This information (the adjustments) is then sent to the "pose" model used, for example, by the rendering techniques.

In future mobile devices that improve environmental awareness, it can be possible to reduce error and thus drift and/or jitter.

It some embodiments of the AFLGES, the calibration corrections (to accommodate drift) are determined 30 times a second to insure that the augmentations appear in the "correct" location on the field.

Rendering—Alignment

The client AR application that executes as part of an ARLGES augments a live video stream of a sporting event from a mobile device's forward facing camera. A 3D model of the stadium and information about the user's general position allows the system to draw features onto a virtual field in the correct aspect. A variety of error sources exist including model inaccuracies, device sensor drift, and camera calibration.

ARFX, an embodiment of ARLGES uses computer vision as a technique for registering the 3D model more accurately using the live video stream. One example implementation of ARFX uses Unity and OpenCV, which is an industry standard open source framework for implementing computer vision tasks. Information on OpenCV can be found at opencv.org. The video stream is obtained by accessing object texture data. Texture sources can be the device camera or a static movie file. Movie files taken in different stadium positions, lighting conditions, and crowd configurations are used in the development of the CV components.

The goal of this CV component is to identify corner points on the thick white perimeter line of the field. This allows the rendering algorithms to draw the augmentations in the correct places relative to the field. A Hough transform is used to identify straight lines. When candidate lines are identified with sufficient confidence, their intersection in screen coordinates can be projected to world space, enabling improved registration of the 3D stadium model. The images go through preprocessing before the Hough transform can be applied, and the results of the transform are then analyzed in order to select the appropriate candidate lines.

The preprocessing stages include:
Green Detection
Green Mask
Field Line Detection
Skeletonization These are discussed in turn, followed by a description of use of the Hough transform to locate the corners.

Green Detection

Figure 7A:
FIGS. 7A-7E and example illustrates of some of the techniques used for rendering and alignment for a specific user position.

The white field perimeter surrounds a large region of green hue, the playing field. The image is masked by a filter which allows only a range of green hues in the HSV color space. FIG. 7A is an illustration of the techniques used to draw a bounding box around the field. Contiguous regions of green (shown by the scraggly red line) are morphologically opened to connect discontinuous sections of the field, then contoured and the largest region is selected. A minimum area bounding box (the blue rectangle in FIG. 7A) is drawn around this region, and that box is used as a mask for the next step.

Green Mask

Figure 7B:
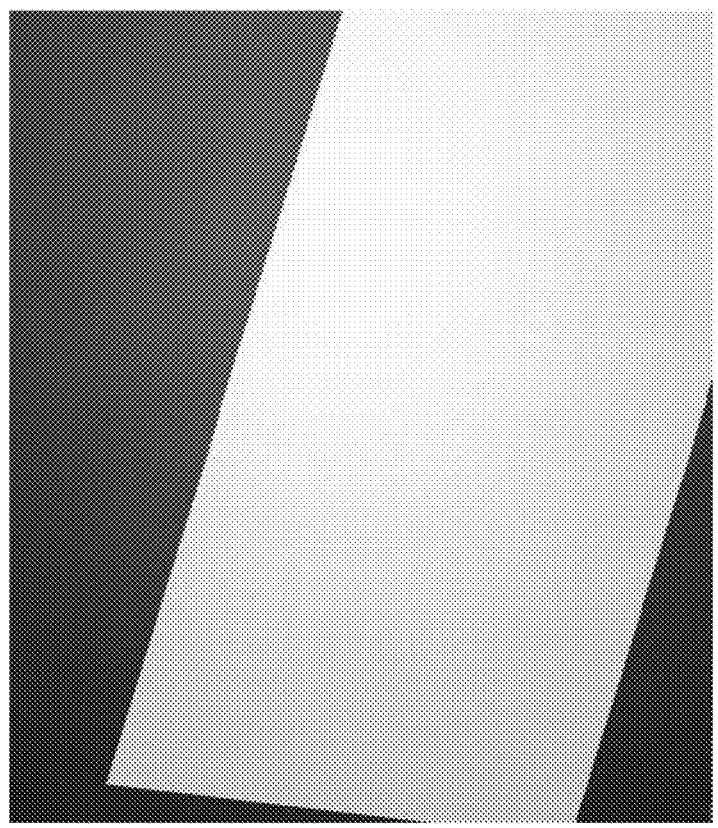

The field's bounding rectangle is used as a mask for the entire image, throwing away information outside the rectangle. FIG. 7B illustrates the bounding rectangle used as a mask.

Field Line Detection

Within the green mask, all white pixels are selected via a lightness range in the HSL color space. FIG. 7C illustrates the selection of all white pixels from the green mask of FIGS. 7A and 7B.

Skeletonization

Figure 7D:
Figure 7C:
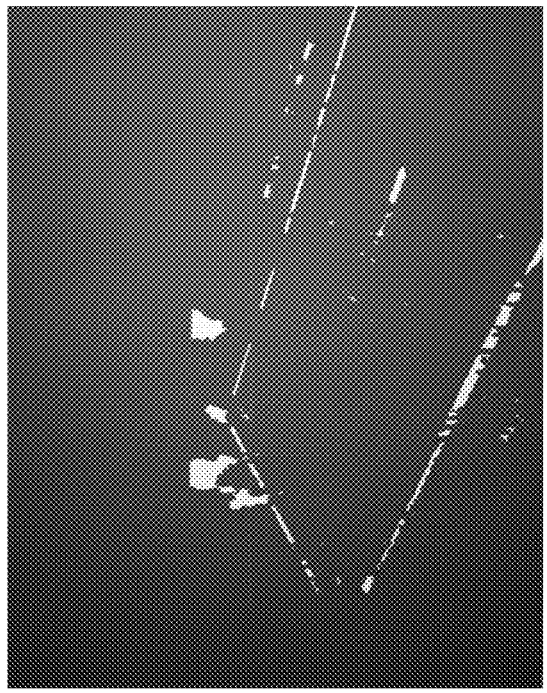

FIG. 7D illustrates the transformations of the white pixels of FIG. 7C. The white regions are transformed with a morphological skeletonization, resulting in features no more than 1 pixel wide. This preserves the linear features and increases the precision while reducing the work of the Hough transform.

Hough Transform

Figure 7E:
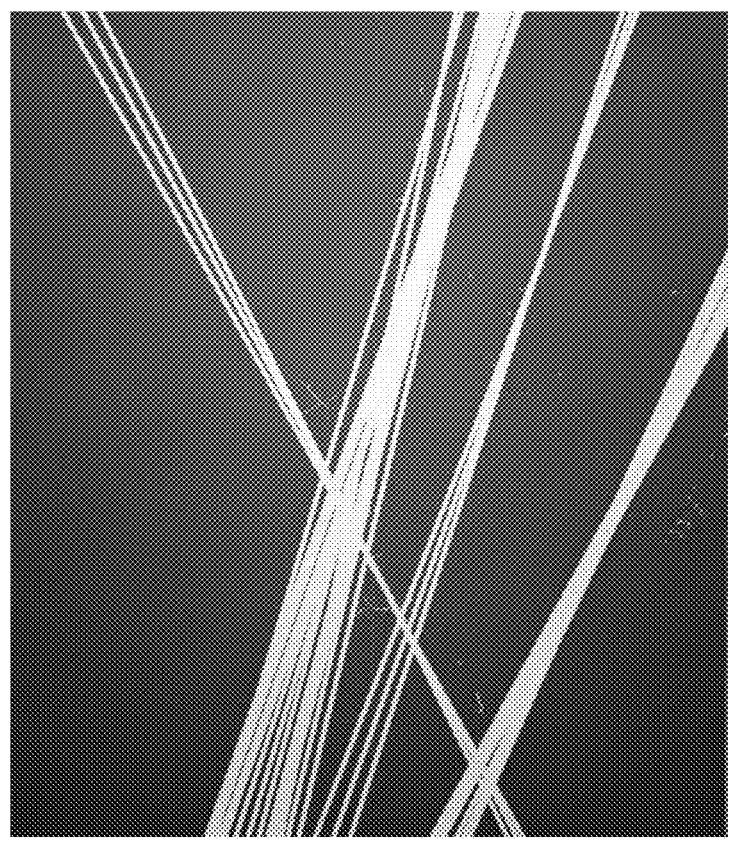

The Hough transform returns candidate lines in screen space. The goal is to reduce \the candidate lines to the minimum number needed to border the field. K-means clustering and a simpler local maximum search in parametric line space are being evaluated as possible techniques to aid in this process. FIG. 7E illustrates candidate lines in the screen space resulting from a Hough transform process.

Once the candidate Hough lines have been reliably culled, the geometric intersection of the remaining lines will represent the corner points of the field in screen space. This data will be passed to the model positioning components. Additionally, since the model is able to get a close approximation to the correct position, a subset of the entire frame will be sent to the CV component which is estimated to contain a detectable feature. Returning the screen coordinates within this subsample only will enable a reduced the processing load, which is important for device energy consumption.

Rendering—Determining Background Using Chroma Keys

One of the challenges of accurately augmenting a live event video stream in a stadium from the position and orientation of the user's mobile device is determining a priori what is the background (the field) upon which the augmentations (e.g., a scrimmage line) are rendered. This is because the user's mobile device camera is not in a known position, with known characteristics such that the color of the background is easily discernable. In addition, the rendering algorithms have no control over what the user does with his or her camera.

Once the field (background) color is known, it is possible to use current rendering techniques to determine whether an augmentation to be drawn is occluded by something in the foreground or not. That is, when a pixel (from the camera feed) is observed by the rendering application, it needs to determine whether it is part of the background, or is part of an object that is passing in front or behind the augmentation being displayed, in whole or in part. For example, to display the yellow scrimmage line properly, the ARLGES needs to determine whether an object it detects (a pixel color that is not likely part of the field) is passing in front of it, in which case the part of the augmentation—the yellow scrimmage line—that is obscured by the object is not drawn. These computations are performed in a time efficient manner without increasing the energy consumption to a point where the mobile device cannot maintain its charge.

Figure 8A:
FIGS. 8A and 8B illustrate the outcome of rendering techniques used with the Augmented Reality Live Game Enhancement System to determine ordering of objects relative to augmentations to inform the graphics rendering pipeline.
Figure 8B:
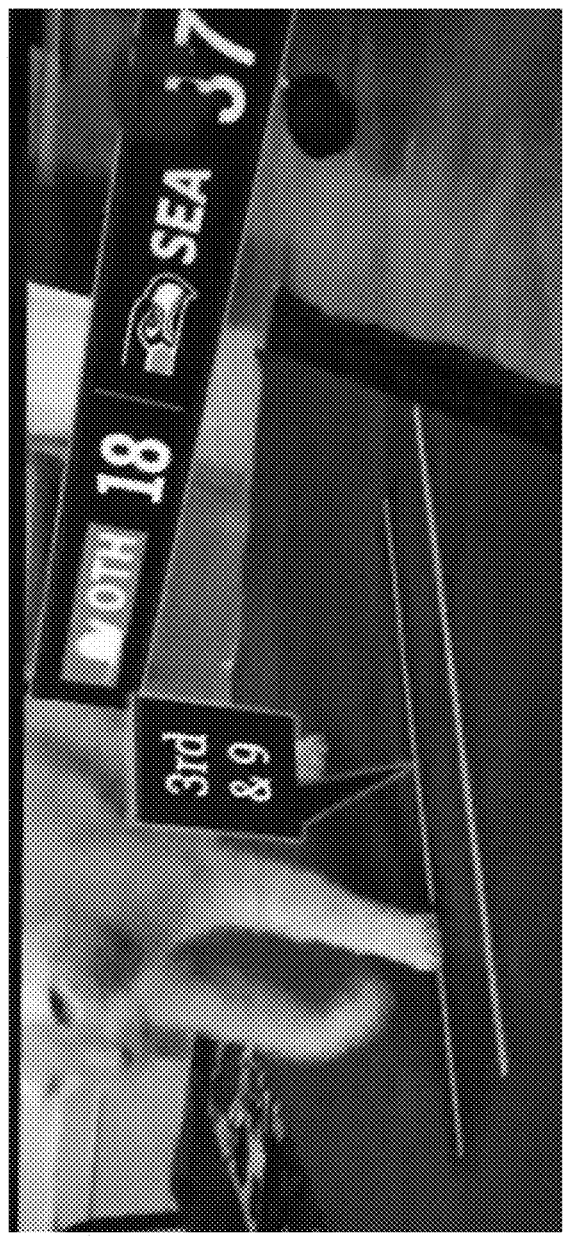

FIGS. 8A and 8B illustrate the outcome of rendering techniques used with the ARLGES to determine ordering of objects relative to augmentations to inform the graphics rendering pipeline. Specifically, to render an expected augmentation, the techniques determine the background color and use this to determine whether an object is passing in front of an augmentation (between the augmentation and the camera of the client device) or whether the augmentation should be presented in front of a passing object.

In one embodiment, the ARLGES rendering techniques (hereinafter the rendering tool) determines what color is the field (the background) on a continuous or near continuous basis instead of only doing this once when initial calibration of the client application is performed. This provides the rendering tool with greater accuracy as the environment is dynamic and changes with lighting and/or positional changes of the user. In addition, the user may be pointing the camera of the mobile device in such a way that the field color isn't seen at all, thus, it is difficult if not impossible to determine how to render augmentations (using green screen or other filtering techniques).

In one embodiment, a master chroma key is provided by some external mechanism and stored in a data repository where it can be accessed by the rendering tool. A chroma key provides, for example, a value that represents the color of the stadium field for that particular camera (of a user's mobile device) so that the rendering algorithms will know what data (e.g. pixels in a video stream) is likely to represent the field. For example, as described with reference to FIG. 5, the master key 525 may be provided to the Game and AR Related Data Repository 505 and supplied via the Game Related Data and Compute Services 506 to the AR application executing on the user's phone. This master key may be updated and represents best known brightness and color values for the green of the field (the background).

The rendering tool executing on the user's mobile device, computes a range of the likely values to express the green colors that correspond to the field. For example, brightness and color can be expressed using hue, saturation, and light (HSL) values, or red, green, and blue (RGB) values, or other color model values. This range is updated continuously using a dynamic sampling technique that re-determines the likely values of the background color for use in determining rendering order, occlusion, and the like.

In one embodiment the dynamic sampling works as follows. Initially (when the tool starts running) 5 different chroma keys specific to the user's mobile device are computed using 5 locations that assumed by the tool to exist within the field. In each iteration, these 5 chroma keys are compared with the master key and if they are within a certain threshold of the color value of the master key, they are retained and the range of the background is updated to reflect this. Then 25 additional "samples" (of pixels) are randomly chosen from what the tool infers are within the borders of the field (for example, using known attribute values from the device such as zoom position, focal length, and the like) and these values are compared with the current 5 chroma keys and again with the master key. In some embodiments, these comparisons are weighted to inform the tool regarding the current range of color values for the background. The values from the 5 chroma keys are weighted more heavily than those from the 25 random samples. (This implies that a difference in color value between a chroma key and the master key will have a greater effect on the tool's perceived color range than the same difference in value at one of the 25 samples and one of the 5 chroma keys.) At the end of each iteration, the current range of possible values for the background is recomputed and some number of the values from the 25 samples and 5 keys and the master key are input to the next iteration of the tool. The weighting of the comparisons and the selection of a number of the values allows the tool to establish a range of the background color values to a higher degree of confidence. In some example embodiments, this rolling sampling is performed at least 10 times per sec (with 25 samples used) resulting in the use of at least 250 samples to designate a range of likely background color values.

Enhancements to sampling may include using different types of randomization techniques to select the (25) points for sampling. In one such embodiment, a Monte Carlo estimation technique is used. As another enhancement, a ray tracing technique (from an internal tool model of the user to an internal tool model of the field) is used to confirm the accuracy that a point is within the expected field. These enhancements can be applied cumulatively.

In sum, the rolling sampling techniques performed on a continuous basis result in better accuracy of establishing the (green) background upon which the augmentations such as the scrimmage lines are drawn.

Example Computing System

Figure 9:
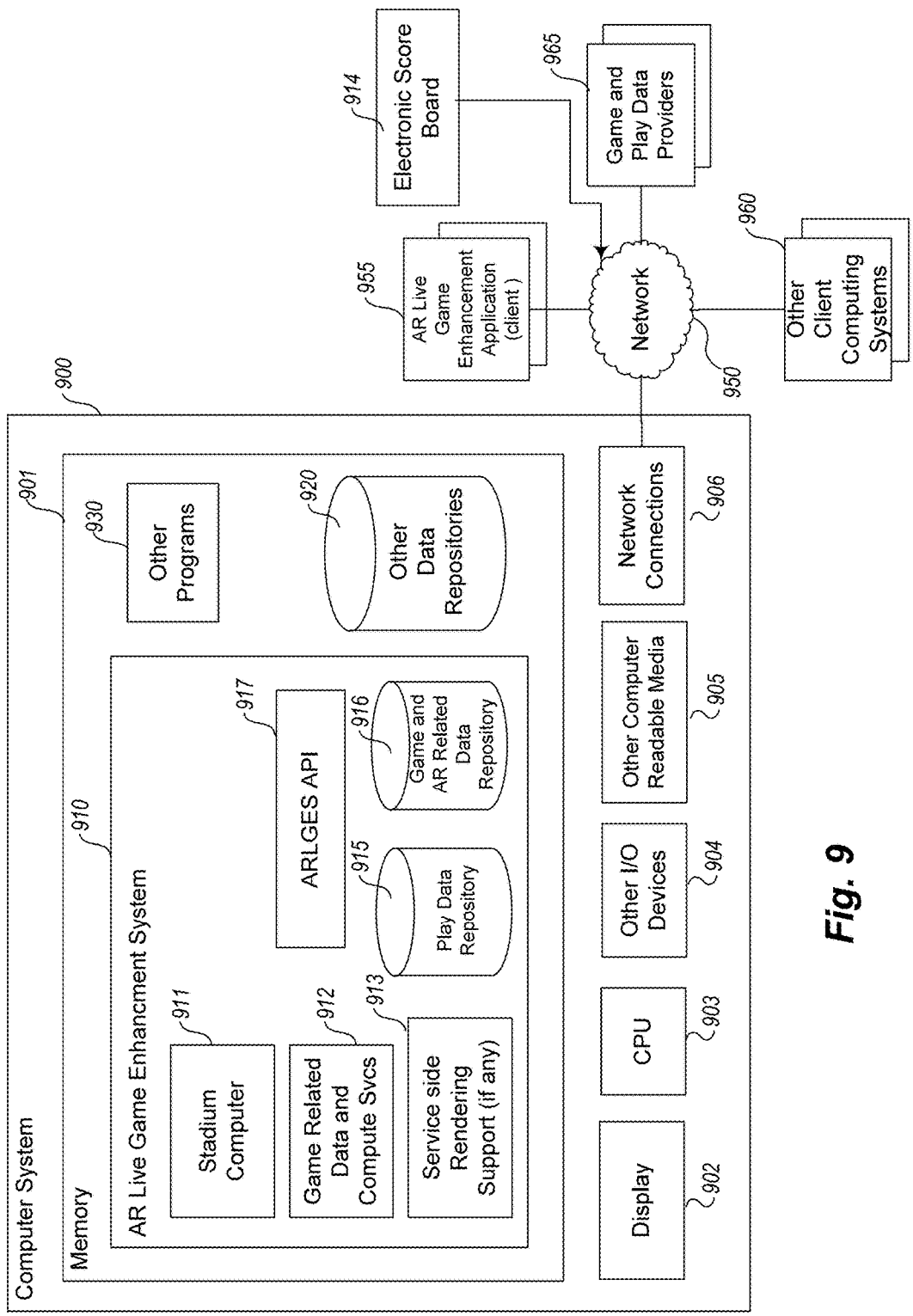
FIG. 9 is an example block diagram of an example computing system that may be used to practice embodiments of a Augmented Reality Live Game Enhancement System described herein.

FIG. 9 is an example block diagram of an example computing system that may be used to practice embodiments of a Augmented Reality Live Game Enhancement System described herein. Note that one or more general purpose virtual or physical computing systems suitably instructed or a special purpose computing system may be used to implement an ARLGES. Further, the ARLGES may be implemented in software, hardware, firmware, or in some combination to achieve the capabilities described herein.

Note that one or more general purpose or special purpose computing systems/devices may be used to implement the described techniques. However, just because it is possible to implement the ARLGES on a general purpose computing system does not mean that the techniques themselves or the operations required to implement the techniques are conventional or well known.

The computing system 900 may comprise one or more server and/or client computing systems and may span distributed locations. In addition, each block shown may represent one or more such blocks as appropriate to a specific embodiment or may be combined with other blocks. Moreover, the various blocks of the ARLGES 910 may physically reside on one or more machines, which use standard (e.g., TCP/IP) or other interprocess communication mechanisms to communicate with each other.

In the embodiment shown, computer system 900 comprises a computer memory ("memory") 901, a display 902, one or more Central Processing Units ("CPU") 903, Input/

Output devices 904 (e.g., keyboard, mouse, CRT or LCD display, etc.), other computer-readable media 905, and one or more network connections 906. The ARLGES 910 is shown residing in one or more memories 901. In other embodiments, some portion of the contents, some of, or all of the components of the ARLGES 910 may be stored on and/or transmitted over the other computer-readable media 905. The components of the ARLGES 910 preferably execute on one or more CPUs 903 and manage the event data and server side graphics support, as described herein. Other code or programs 930 and potentially other data repositories, such as data repository 906, also reside in the memory 901, and preferably execute on one or more CPUs 903. Of note, one or more of the components in FIG. 9 may not be present in any specific implementation. For example, some embodiments embedded in other software may not provide means for user input or display.

In a typical embodiment, the ARLGES 910 includes one or more stadium computers 911 (such as system 504 in FIG. 5), one or more game related data and computer services 912 (such as component 506 in FIG. 5), and other server side rendering or computer graphics support 913. The electronic score board 914 is shown connected to the overall system (as a separate electronic component). In at least some embodiments, the electronic score board and the data repositories 915 and 916 are provided external to the ARLGES and are available, potentially, over one or more networks 950. Other and/or different modules may be implemented. In some embodiments, some of the components have wired physical connections to the stadium computer 911, for example, the score board 914 and/or the play data repository 915.

In addition, the ARLGES may interact via a network 950 with application or client code 955 that such as the AR Live Game Enhancement Application running on each of the user's mobile devices at the stadium, one or more other client computing systems 960, and/or one or more third-party information provider systems 965, such as those that provide data to the play data repository 916.

Also of note, a client rendering and AR application may execute on a computer system (not shown) similar to computer system 900 having a memory 901, a display 902, one or more Central Processing Units ("CPU") 903, Input/Output devices 904 (e.g., display, etc.), other computer-readable media 905, and one or more network connections 906. In one embodiment, this application executes on a mobile device such as described with reference to FIG. 3.

In an example embodiment, components/modules of the ARLGES 910 are implemented using standard programming techniques. For example, the ARLGES 910 may be implemented as a "native" executable running on the CPU 103, along with one or more static or dynamic libraries. In other embodiments, the ARLGES 910 may be implemented as instructions processed by a virtual machine. A range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the ARLGES 910 (e.g., in the data repositories 915 and 916) can be available by standard mechanisms such as through C, C++, C#, and Java APIs; libraries for accessing files, databases, or other data repositories; through scripting languages such as XML; or through Web servers, FTP servers, or other types of servers providing access to stored data. The repositories 915 and 916 may be implemented as one or more database systems, file systems, or any other technique for storing such information, or any combination of the above, including implementations using distributed computing techniques.

Also the example ARLGES 910 may be implemented in a distributed environment comprising multiple, even heterogeneous, computer systems and networks. Different configurations and locations of programs and data are contemplated for use with techniques of described herein. In addition, the systems may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an ARLGES.

Furthermore, in some embodiments, some or all of the components of the ARLGES 910 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 62/418,686, entitled "AUGMENTED REALITY FOR ENHANCING SPORTING EVENTS," filed Nov. 7, 2016, are incorporated herein by reference, in their entireties.

From the foregoing it will be appreciated that, although specific embodiments have been described herein for purposes of illustration, various modifications may be made without deviating from the spirit and scope of the invention. For example, the methods and systems for performing AR for a live sporting event discussed herein are applicable to other architectures other than a mobile device architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. An augmented reality system for providing augmentations to a live sporting event being performed on a stadium field, comprising:
    a sporting event data repository that receives play data from a plurality of sources on a periodic basis, the play data comprising one or more of sequences of plays, information about the players, information about the live sporting event, and that receives data used for computer graphics rendering;
    a stadium computer system communicatively connected to a score board and the sporting event data repository; and
    sporting event compute services connected wirelessly to a plurality of client mobile devices, each executing an augmented reality application that subscribes to sporting event data and stadium graphics information available from the sporting event compute services, wherein the client mobile devices each receive sporting event data and stadium graphics information pushed from the sporting event compute services and render augmentations on a display screen of the client mobile device to augment the live sporting event while a user is viewing the event live as the event is in play, wherein each client mobile device is configured to render augmentations using an augmented reality application executing on each respective client mobile device based upon the pushed information and based upon a rendering model generated and calibrated by each respective device, the rendering model for each respective device based upon a real time determination of the respective device position and orientation relative to the stadium and based upon one or more chroma keys uniquely associated with the respective device, the one or more chroma keys based upon the determined device position and orientation and configured to be dynamically modified during event play.

2. The system of claim 1 wherein the sporting event data repository comprises a play data repository updated on a regular basis and a game and rendering related data repository, wherein the stadium computer system is communicatively connected to the play data repository to receive a stream of play data and wherein the stadium computer system stores the stream of play data in the game and rendering related data repository for use by the sporting event compute services.

3. The system of claim 2 wherein the score board is electronic and updated separately from the play data repository of the sporting event data repository.

4. The system of claim 1 wherein, for each respective client mobile device, the rendering model is derived from sampling at least 20 frames per second and inferring a chroma key relative to current lighting conditions in relation to the respective client mobile device.

5. The system of claim 4 wherein the rendering model removes objects for drawing purposes based upon dissimilarity to the inferred chroma key associated with the respective client mobile device.

6. The system of claim 1 wherein the augmentations are determined and automatically configured by the augmented reality application executing on each respective client mobile device based upon calibrating its own position and orientation relative to the physical stadium.

7. The system of claim 6 wherein the position calibrated for each augmented reality application is determined by mapping the respective client mobile device to a latitude, longitude, and altitude relative to the stadium field.

8. The system of claim 7 wherein the location calibrated for each augmented reality application is determined by mapping a seat number of the user to three dimensional coordinates of a three dimensional model of the stadium.

9. The system of claim 6 wherein the orientation calibrated for each augmented reality application is determined as an orientation to the stadium field and is generated using a sensor of the respective client mobile device.

10. The system of claim 6 wherein the augmented reality application displays a different augmentation on each of a plurality of client mobile devices based upon each of the plurality of client mobile devices observing the live event from a different angle.

11. The system of claim 1 wherein the client mobile device is an augmented reality headset.

12. A method in a plurality of client mobile computing devices for providing augmentations to a live sporting event being performed on a stadium field, the augmentations for each of the respective plurality of client mobile computing devices generated and calibrated based upon the respective client device, comprising:
    for each respective client mobile computing device, executing an augmented reality application configured for:
        receiving an indication of a seat location from which the client mobile computing device is viewing the stadium field;
        calibrating the application in real time to a three dimensional position of the respective computing device based upon the received seat location and to an orientation of the respective computing device and aligning a camera of the computing device to render augmentations in a correct aspect onto a virtual event field corresponding to the stadium field; and
        presenting augmentations in real time onto the virtual event field on a display of the respective client mobile computing device as a user is viewing the event live on the stadium field, the augmentations being configured specific to the respective computing device based upon one or more chroma keys uniquely associated with the respective computing device, the one or more chroma keys based upon the determined device position and orientation and configured to be dynamically modified during event play.

13. The method of claim 12 wherein the augmentations comprise one or more of: game specific augmentations, contextual augmentations, or always-on augmentations.

14. The method of claim 12 wherein the calibration of the application to align the camera of the computing device uses computer vision techniques including one or more of green detection and masking, field line detection, and skeletonization to align the field to the camera of the computing device.

15. The method of claim 12 wherein the calibration of the application to align the camera of the computing device uses a transform to locate the expected corners of the virtual stadium filed.

16. The method of claim 12 wherein the received seat location is compared to a three dimensional rendering model of the stadium to determine a three dimensional expected location of the camera of the computing device.

17. The method of claim 12, further comprising:
sensing an actual position of the mobile client computing device and comparing the sensed position to the calibrated application position and orientation; and
adjusting rendering of the presented augmentations to account for camera drift or other differences between the sensed position and computed corners of the virtual event field.

18. A computer-readable memory medium comprising instructions the comprise an augmented reality application configured to control a computer processor in a mobile client comprising device to perform a method comprising:
receiving an indication of a seat location from which the client mobile computing device is viewing the stadium field;
calibrating the application in real time to a three dimensional position of the mobile client computing device based upon the received seat location and to an orientation of the computing device and based upon a computed alignment of a camera of the computing device to render augmentations in a correct aspect onto a virtual event field corresponding to the stadium field;
sensing an actual position of the mobile client computing device;
comparing the sensed position to the calibrated application to adjust for error in expected orientation and position; and
presenting augmentations in real time onto the virtual event field on a display of the client mobile computing device as a user is viewing the event live on the stadium field adjusting for the error in expected orientation and position, the augmentations being configured unique to the computing device based upon one or more chroma keys associated with the computing device, the one or more chroma keys based upon the determined device position and orientation and configured to be dynamically modified during event play.

19. The computer-readable memory medium of claim 18 wherein the method further comprises repeating the actions of sensing the actual position and comparing the sensed position to the calibrated application at a determined frequency to reduce error, drift, or jitter.

* * * * *

UNITED STATES PATENT AND TRADEMARK OFFICE
CERTIFICATE OF CORRECTION

| | | |
|---|---|---|
| PATENT NO. | : 10,325,410 B1 | Page 1 of 1 |
| APPLICATION NO. | : 15/696171 | |
| DATED | : June 18, 2019 | |
| INVENTOR(S) | : Eric Smith et al. | |

It is certified that error appears in the above-identified patent and that said Letters Patent is hereby corrected as shown below:

In the Claims

In Column 19, Line 21 (Claim 18), "the" should read --that--.

Signed and Sealed this
Thirteenth Day of August, 2019

Andrei Iancu
*Director of the United States Patent and Trademark Office*